(12) United States Patent
Schwartz et al.

(10) Patent No.: US 9,595,016 B1
(45) Date of Patent: Mar. 14, 2017

(54) METHOD AND APPARATUS FOR DYNAMIC WORKFORCE OPTIMIZATION

(75) Inventors: Larry S. Schwartz, Cincinnati, OH (US); Mitesh D. Desai, Plano, TX (US)

(73) Assignee: WORKFLEX SOLUTIONS, Cincinnati, OH (US)

(*) Notice: Subject to any disclaimer, the term of this patent is extended or adjusted under 35 U.S.C. 154(b) by 424 days.

(21) Appl. No.: 13/136,724

(22) Filed: Aug. 9, 2011

Related U.S. Application Data

(60) Provisional application No. 61/401,244, filed on Aug. 10, 2010.

(51) Int. Cl.
*G06Q 10/00* (2012.01)
*G06Q 10/06* (2012.01)

(52) U.S. Cl.
CPC .................. *G06Q 10/063116* (2013.01)

(58) Field of Classification Search
CPC ... G06Q 10/063116; G06Q 10/063118; G06Q 10/06312
USPC ...................................... 705/11–44
See application file for complete search history.

(56) References Cited

U.S. PATENT DOCUMENTS

| | | | | |
|---|---|---|---|---|
| 5,907,829 A * | 5/1999 | Kida | .............. | G06Q 10/063116 705/7.16 |
| 7,069,097 B1 * | 6/2006 | Barto | .................... | G06Q 10/06 700/100 |
| 8,788,308 B1 * | 7/2014 | Cox | .............. | G06Q 10/063116 705/7.13 |
| 2005/0137925 A1 * | 6/2005 | Lakritz | .................. | G06Q 10/06 705/7.22 |
| 2010/0017251 A1 * | 1/2010 | Rawle | ................. | G06Q 10/063 705/7.11 |

* cited by examiner

*Primary Examiner* — Alan S Miller
*Assistant Examiner* — Zahra Elkassabgi
(74) *Attorney, Agent, or Firm* — Frost Brown Todd LLC

(57) ABSTRACT

A business can use an improved workforce management system which includes capabilities for supporting intraday dynamic staffing. This dynamic staffing can include identifying wages which should be offered to workers to induce them to meet the business' needs, based on, for example, historical information stored in a database. Systems which include dynamic intraday staffing can be run using remote servers and interfaces accessed through various types of devices, such as internet enabled personal computers.

18 Claims, 6 Drawing Sheets

METHOD AND APPARATUS FOR DYNAMIC WORKFORCE OPTIMIZATION

INCORPORATION BY REFERENCE

This application claims priority to U.S. Provisional Patent Application Ser. No. 61/401,244, which was filed on Aug. 10, 2010, the entirety of which is incorporated herein by reference for all purposes This application incorporates by reference in its entirety the information from the computer program listing appendix submitted herewith, comprising the files listed below:

| Created | Size | Name |
|---|---|---|
| Directory of d:\WorkFlex Manager Source Code (1) | | |
| 07/29/2010 03:37 PM | 8,641 | AC_OETags.txt |
| 07/29/2010 03:37 PM | 7,465 | Addbu.txt |
| 07/29/2010 03:37 PM | 5,104 | Addclient.txt |
| 07/29/2010 03:37 PM | 1,599 | Addrtc.txt |
| 07/29/2010 03:38 PM | 3,095 | Addrtc1.txt |
| 07/29/2010 03:39 PM | 10,494 | Addrulegroupassociation.txt |
| 07/29/2010 03:40 PM | 4,194 | Addskill.txt |
| 07/29/2010 03:42 PM | 8,108 | adduser.txt |
| 07/29/2010 03:42 PM | 2,079 | adduserjs.txt |
| 07/29/2010 04:07 PM | 7,933 | Castats.txt |
| 07/29/2010 03:54 PM | 2,991 | Castatsdetail.txt |
| 07/29/2010 04:07 PM | 2,901 | changeparam.css.txt |
| 07/29/2010 03:53 PM | 963 | Checkrulegroupassociate.txt |
| 07/29/2010 03:53 PM | 441 | Chkobjects.txt |
| 07/29/2010 03:53 PM | 4,517 | Clientadmin.txt |
| 07/29/2010 03:52 PM | 5,004 | Clientheadermenu.txt |
| 07/29/2010 03:52 PM | 845 | Clientnamexml.txt |
| 07/29/2010 03:51 PM | 9,896 | common.txt |
| 07/29/2010 03:50 PM | 19,216 | Configbu.txt |
| 07/29/2010 03:50 PM | 9,415 | Configdb.txt |
| 07/29/2010 03:50 PM | 18,599 | Copyrule.txt |
| 07/29/2010 03:50 PM | 2,894 | createrule.css.txt |
| 07/29/2010 03:49 PM | 20,393 | Createrule.txt |
| 07/29/2010 03:50 PM | 24,070 | createrulejs.txt |
| 07/29/2010 03:49 PM | 7,060 | Createrulemgmt.txt |
| 07/29/2010 03:53 PM | 18,979 | Createrulemgmtassociate.txt |
| 07/29/2010 03:56 PM | 498 | Deletertcmsg.txt |
| 07/29/2010 04:07 PM | 693 | Deletetestlog.txt |
| 07/29/2010 03:57 PM | 13,707 | demos.css.txt |
| 07/29/2010 04:20 PM | 5,864 | Editclient.txt |
| 07/29/2010 04:20 PM | 4,613 | Editrtc.txt |
| 07/29/2010 04:19 PM | 19,317 | Editrule.txt |
| 07/29/2010 04:19 PM | 14,344 | Editrulegroupassociation.txt |
| 07/29/2010 04:19 PM | 4,944 | Editskill.ba |
| 07/29/2010 04:19 PM | 9,043 | Edituser.txt |
| 07/29/2010 04:18 PM | 17,125 | Exceptionreport.txt |
| 07/29/2010 04:18 PM | 1,085 | Existclientandskillxml.txt |
| 07/29/2010 04:17 PM | 1,685 | Existprogramxmllist.txt |
| 07/29/2010 04:20 PM | 1,929 | ExReport.txt |
| 07/29/2010 04:20 PM | 16,316 | Extendedhourreport.txt |
| 07/29/2010 04:33 PM | 145 | Footer.jspf.txt |
| 07/29/2010 04:33 PM | 829 | Forcastruleparser.txt |
| 07/29/2010 04:32 PM | 2,539 | Getrtcmsg.txt |
| 07/29/2010 04:32 PM | 758 | Getrtcupdate.txt |
| 07/29/2010 04:32 PM | 742 | Getruledetail.txt |
| 07/29/2010 04:33 PM | 829 | Header.jspf.txt |
| 07/29/2010 04:36 PM | 15,915 | Headermenu.txt |
| 07/29/2010 04:36 PM | 8,310 | Index.txt |
| 07/29/2010 04:35 PM | 862 | InsertreportData.txt |
| 07/29/2010 04:35 PM | 5,104 | Login.txt |
| 07/29/2010 04:35 PM | 966 | menu.css.txt |
| 07/29/2010 04:34 PM | 6,550 | Notificationmsg.txt |
| 07/29/2010 04:34 PM | 15,532 | Parameters.txt |
| 07/29/2010 04:34 PM | 2,654 | Parsertest.txt |
| 07/29/2010 04:34 PM | 1,211 | Parsertestcache.txt |
| 07/29/2010 04:42 PM | 12,419 | Programs.txt |
| 07/29/2010 04:42 PM | 1,027 | Programxml.txt |
| 07/29/2010 04:42 PM | 2,775 | Programxmllist.txt |
| 07/29/2010 04:39 PM | 1,620 | Resetpwd.txt |
| 07/29/2010 04:39 PM | 5,627 | Resetpwd1jsp.txt |
| 07/29/2010 04:37 PM | 4,360 | rollbackrule.txt |
| 07/29/2010 04:37 PM | 40,618 | Rtc.txt |
| 07/29/2010 04:44 PM | 1,253 | Rtccumulativedata.txt |
| 07/29/2010 04:45 PM | 2,538 | Rtcexceptionslist.txt |
| 07/29/2010 04:46 PM | 1,554 | Rtcresultdatamonth.txt |
| 07/29/2010 05:05 PM | 1,523 | Rtcresultdatatoday.txt |
| 07/29/2010 05:05 PM | 1,541 | Rtcslotdata.txt |
| 07/29/2010 05:06 PM | 2,535 | Rtcweekxml.txt |
| 07/29/2010 05:06 PM | 5,944 | Rulegroupassociationdeploy.txt |
| 07/29/2010 05:08 PM | 21,335 | Rulegroupassociationtestby.txt |
| 07/29/2010 05:08 PM | 6,223 | Rulesassociations.txt |
| 07/29/2010 05:08 PM | 2,592 | Rulesassociationsl.txt |
| 07/29/2010 05:07 PM | 1,463 | Ruleslibary.txt |
| 07/29/2010 05:07 PM | 2,901 | ruletest.css.txt |
| 07/29/2010 05:07 PM | 11,580 | ruletest.txt |
| 07/29/2010 05:07 PM | 13,356 | Ruletests.txt |
| 07/29/2010 05:07 PM | 18,988 | Ruleversions.txt |
| 07/29/2010 05:08 PM | 771 | Runruleshowrule.txt |
| 07/29/2010 05:11 PM | 1,398 | script.txt |
| 07/29/2010 05:11 PM | 35,770 | Sendmail.txt |
| 07/29/2010 05:10 PM | 15,541 | Setparameters.txt |
| 07/29/2010 05:10 PM | 576 | Setrulelibarypopup.txt |
| 07/29/2010 05:15 PM | 15,084 | Setruleparameter.txt |
| 07/29/2010 05:11 PM | 20,723 | setruleparameterjs.txt |
| 07/29/2010 05:10 PM | 497 | Showrulexml.txt |
| 07/29/2010 05:09 PM | 820 | Skillnamexml.txt |
| 07/29/2010 05:09 PM | 1,303 | sliding_popup.txt |
| 07/29/2010 05:12 PM | 16,542 | Staffplaningreport.txt |
| 07/29/2010 05:12 PM | 17,465 | Staffreport.txt |
| 07/29/2010 05:12 PM | 4,154 | style.css.txt |
| 07/29/2010 05:12 PM | 6,681 | Submitaddbu.txt |
| 07/29/2010 05:13 PM | 418 | Submitcreaterule.txt |
| 07/29/2010 05:13 PM | 8,098 | Submitprogramlist.txt |
| 07/29/2010 05:13 PM | 9,523 | test.txt |
| 07/29/2010 05:13 PM | 23,358 | Testchangeruleparameter.txt |
| 07/29/2010 05:14 PM | 14,457 | Testchangeruleparameterjsp.txt |
| 07/29/2010 05:12 PM | 15,531 | Testsetparameters.txt |
| 07/29/2010 05:18 PM | 3,999 | ui.datepicker.css.txt |
| 07/29/2010 05:18 PM | 1,049 | ui.tabs.css.txt |
| 07/29/2010 05:17 PM | 18,124 | ui.theme.css.txt |
| 07/29/2010 05:17 PM | 1,323 | Updatemsgstatus.txt |
| 07/29/2010 05:17 PM | 16,552 | validate.txt |
| 07/29/2010 05:17 PM | 6,134 | Viewclient.txt |
| 07/29/2010 05:17 PM | 5,654 | Viewrulegroup.txt |
| 07/29/2010 05:17 PM | 9,624 | Viewrules.txt |
| 07/29/2010 05:16 PM | 6,473 | Viewskill.txt |
| 07/29/2010 05:16 PM | 6,867 | Viewuserdetail.txt |
| 07/29/2010 05:16 PM | 26,036 | Weekreport.txt |
| 07/28/2010 09:16 PM | 7,521 | Wfmstats.txt |
| 07/29/2010 05:18 PM | 3,107 | Wfmstatsdetail.txt |
| 07/29/2010 05:18 PM | 4,841 | XMLWriter-1.0.0.txt |
| Directory of d:\WorkFlex Manager Source Code (1)\Agent | | |
| 07/29/2010 05:19 PM | 9,871 | Agent.txt |
| 07/29/2010 05:19 PM | 145 | Footer.jspf.txt |
| 07/29/2010 05:19 PM | 661 | Header.jspf.txt |
| 07/29/2010 05:19 PM | 5,035 | Login.txt |
| Directory of d:\WorkFlex Manager Source Code (1)\com\workflex\agent | | |
| 07/30/2010 12:34 PM | 2,461 | AgentDetails.java.txt |
| 07/30/2010 12:34 PM | 5,736 | AgentDetailUpdate.java.txt |
| 07/30/2010 12:34 PM | 5,437 | AgentLoginService.java.txt |
| 07/30/2010 12:33 PM | 2,078 | Auththenticator.java.txt |
| Directory of d:\WorkFlex Manager Source Code (1)\com\workflex\api\callout | | |
| 07/30/2010 12:33 PM | 23,896 | CalloutManager.java.txt |
| Directory of d:\WorkFlex Manager Source Code (1)\com\workflex\brms | | |
| 07/30/2010 12:21 PM | 572 | ActionObject.java.txt |
| 07/30/2010 12:21 PM | 861 | BroObject.java.txt |
| 07/30/2010 12:21 PM | 759 | BroResultObject.java.txt |
| 07/30/2010 12:21 PM | 1,121 | ConditionObject.java.txt |
| 07/30/2010 12:21 PM | 1,434 | CreateRuleFromXml.java.txt |
| 07/30/2010 12:21 PM | 900 | EvalObject.java.txt |
| 07/30/2010 12:21 PM | 1,072 | IfObject.java.txt |
| 07/30/2010 12:21 PM | 21,618 | MyForcastRuleParser.java.txt |
| 07/30/2010 12:21 PM | 20,920 | MyRuleParser.java.txt |
| 07/30/2010 12:20 PM | 11,288 | MySmartRuleParser.java.txt |
| 07/30/2010 12:20 PM | 10,895 | RuleObject.java.txt |
| 07/30/2010 12:20 PM | 2,623 | UpdateObjectData.java.txt |
| 07/30/2010 12:22 PM | 4,242 | UpdateObjectDataFromXml.java.txt |

-continued

| Created | Size | Name |
|---|---|---|
| Directory of d:\WorkFlex Manager Source Code (1)\com\workflex\brms\changeparameter | | |
| 07/30/2010 12:33 PM | 10,414 | Changecalloutparam.java.txt |
| 07/30/2010 12:32 PM | 22,188 | MyChangeparamParser.java.txt |
| Directory of d:\WorkFlex Manager Source Code (1)\com\workflex\brms\commons | | |
| 07/30/2010 12:32 PM | 889 | DateSlot.java.txt |
| 07/30/2010 12:32 PM | 1,386 | JDOMValidator.java.txt |
| 07/30/2010 12:32 PM | 4,028 | MyObjectCompare.java.txt |
| 07/30/2010 12:32 PM | 2,243 | NodeLister.java.txt |
| 07/30/2010 12:32 PM | 2,574 | ReadAssociatedRuleXml.java.txt |
| 07/30/2010 12:32 PM | 2,631 | ReadAssociatedTempRuleXml.java.txt |
| 07/30/2010 12:31 PM | 4,401 | Slots.java.txt |
| 07/30/2010 12:31 PM | 14,352 | Utils.java.txt |
| 07/30/2010 12:31 PM | 1,588 | WorkflexDateUtils.java.txt |
| 07/30/2010 12:31 PM | 1,754 | WriteIfc.java.txt |
| Directory of d:\WorkFlex Manager Source Code (1)\com\workflex\brms\parser | | |
| 07/30/2010 12:25 PM | 1,272 | BackgroudParserOutput.txt |
| 07/30/2010 12:25 PM | 11,184 | BackgroundParseEngine.java.txt |
| 07/30/2010 12:25 PM | 5,015 | BackgroundRuleParser.java.txt |
| 07/30/2010 12:25 PM | 1,175 | ContextCleanup.java.txt |
| 07/30/2010 12:25 PM | 10,399 | ForcastParseEngine.java.txt |
| 07/30/2010 12:24 PM | 7,127 | ForcastRuleParser.java.txt |
| 07/30/2010 12:23 PM | 8,204 | ParseEngineTest.java.txt |
| 07/30/2010 12:23 PM | 9,918 | RuleParserTest.java.txt |
| 07/30/2010 12:23 PM | 2,595 | RunningCleanup.java.txt |
| 07/30/2010 12:23 PM | 8,212 | RuntimeParseEngine.java.txt |
| 07/30/2010 12:23 PM | 9,583 | RuntimeRuleParser.java.txt |
| 07/30/2010 12:23 PM | 2,164 | ThreadTest.java.txt |
| 07/30/2010 12:25 PM | 3,953 | ViewRuleList.java.txt |
| Directory of d:\WorkFlex Manager Source Code (1)\com\workflex\brms\parser\smart | | |
| 07/30/2010 12:22 PM | 1,136 | GapAnalysisObj.java.txt |
| 07/30/2010 12:22 PM | 12,450 | SmartParser.java.txt |
| Directory of d:\WorkFlex Manager Source Code (1)\com\workflex\brms\test | | |
| 07/30/2010 12:22 PM | 23,279 | MyTestRuleParser.java.txt |
| 07/30/2010 12:22 PM | 24,754 | PerticularTestRuleParser.java.txt |
| 07/30/2010 12:22 PM | 4,422 | TestChangeRuleParam.java.txt |
| Directory of d:\WorkFlex Manager Source Code (1)\com\workflex\business | | |
| 07/29/2010 06:18 PM | 992 | CheckSkill.java.txt |
| 07/29/2010 06:18 PM | 9,490 | ClientProfileMaster.java.txt |
| 07/29/2010 06:18 PM | 5,758 | ClientProfileService.java.txt |
| 07/29/2010 06:18 PM | 5,371 | SkillMaster.java.txt |
| 07/29/2010 06:18 PM | 5,127 | SkillService.java.txt |
| Directory of d:\WorkFlex Manager Source Code (1)\com\workflex\business\clientadmin | | |
| 07/29/2010 06:23 PM | 2,389 | Castats.java.txt |
| 07/29/2010 06:21 PM | 8,072 | Statistics.java.txt |
| Directory of d:\WorkFlex Manager Source Code (1)\com\workflex\business\rules | | |
| 07/29/2010 06:43 PM | 5,703 | AddBUService.java.txt |
| 07/29/2010 06:43 PM | 3,235 | AddUserMaster.java.txt |
| 07/29/2010 06:43 PM | 12,035 | AddUserService.java.txt |
| 07/29/2010 06:43 PM | 4,754 | Attribute.java.txt |
| 07/29/2010 06:42 PM | 1,068 | CheckObjects.java.txt |
| 07/29/2010 06:42 PM | 1,537 | CheckRuleGroup.java.txt |
| 07/29/2010 06:42 PM | 5,925 | CleintAdmin.java.txt |
| 07/29/2010 06:42 PM | 7,503 | ConfigBUService.java.txt |
| 07/29/2010 06:42 PM | 7,699 | ConfiguredbService.java.txt |
| 07/29/2010 06:43 PM | 3,033 | CreateBusinessRule.java.txt |
| 07/29/2010 06:45 PM | 3,296 | CreateRuleService.java.txt |
| 07/29/2010 06:44 PM | 6,265 | dbconfig1.java.txt |
| 07/29/2010 06:44 PM | 4,806 | DeployprogramNameService.java.txt |
| 07/29/2010 06:44 PM | 5,696 | EditRuledisplay.java.txt |
| 07/29/2010 06:44 PM | 9,882 | EditUserService.java.txt |
| 07/29/2010 06:44 PM | 781 | ExceptionCodes.java.txt |
| 03/18/2010 05:51 PM | 270 | hibernate.properties |
| 07/29/2010 06:44 PM | 1,192 | Parameters.java.txt |
| 07/29/2010 06:44 PM | 13,378 | ProgramXmlList.java.txt |
| 07/29/2010 06:47 PM | 12,137 | ReadXmlFile.java.txt |
| 07/29/2010 06:47 PM | 17,754 | rollbackrule.java.txt |
| 07/29/2010 06:47 PM | 1,034 | RuleAssociations.java.txt |
| 07/29/2010 06:47 PM | 2,073 | RuleassociationsBean.java.txt |
| 07/29/2010 06:47 PM | 33,530 | RuleCompiler.java.txt |

-continued

| Created | Size | Name |
|---|---|---|
| 07/29/2010 06:47 PM | 17,663 | RulegroupAssociate.java.txt |
| 07/29/2010 06:46 PM | 7,351 | RulegroupMaster.java.txt |
| 07/29/2010 06:46 PM | 6,410 | RulegroupService.java.txt |
| 07/29/2010 06:46 PM | 20,073 | RuleSyntaxValidator.java.txt |
| 07/29/2010 06:46 PM | 5,213 | RuleVersion.java.txt |
| 07/29/2010 06:46 PM | 4,782 | RuleVersions.java.txt |
| 07/29/2010 07:41 PM | 1,895 | RuleVersionsData.java.txt |
| 07/29/2010 07:42 PM | 1,052 | RuleVersionsObj.java.txt |
| 07/29/2010 07:42 PM | 13,837 | RuleVersionUtils.java.txt |
| 07/29/2010 07:42 PM | 2,695 | SubmitAgentSkill.java.txt |
| 07/29/2010 07:42 PM | 19,647 | SubmitRule.java.txt |
| 07/29/2010 07:42 PM | 10,638 | SubmitsetparameterService.java.txt |
| 07/29/2010 07:42 PM | 9,927 | TestChangeParam.java.txt |
| 07/29/2010 06:48 PM | 4,732 | TestRuleparser.java.txt |
| 07/29/2010 06:48 PM | 1,698 | UpdateAgentCost.java.txt |
| Directory of d:\WorkFlex Manager Source Code (1)\com\workflex\business\utils | | |
| 07/29/2010 06:20 PM | 8,614 | MasterRecords.java.txt |
| 07/29/2010 06:20 PM | 21,750 | Sftp.java.txt |
| 07/29/2010 06:20 PM | 1,026 | SyncFiles.java.txt |
| 07/29/2010 06:20 PM | 28,341 | WritingRequestXml.java.txt |
| Directory of d:\WorkFlex Manager Source Code (1)\com\workflex\business\wfm | | |
| 07/29/2010 06:19 PM | 3,757 | ProgramWfms.java.txt |
| 07/29/2010 06:18 PM | 3,048 | RuleBean.java.txt |
| 07/29/2010 06:18 PM | 7,932 | Statistics.java.txt |
| 07/29/2010 06:18 PM | 1,911 | Wfmstats.java.txt |
| Directory of d:\WorkFlex Manager Source Code (1)\com\workflex\commons | | |
| 07/29/2010 06:10 PM | 2,945 | Auththenticator.java.txt |
| 07/29/2010 06:10 PM | 5,329 | LoginService.java.txt |
| 07/29/2010 06:10 PM | 4,347 | User.java.txt |
| Directory of d:\WorkFlex Manager Source Code (1)\com\workflex\context | | |
| 07/29/2010 06:09 PM | 1,607 | ContextLoader.java.txt |
| 07/29/2010 06:09 PM | 1,117 | ContextLoaderListener.java.txt |
| Directory of d:\WorkFlex Manager Source Code (1)\com\workflex\controllers | | |
| 07/29/2010 06:00 PM | 7,735 | ActionobjectparamController.java.txt |
| 07/29/2010 06:00 PM | 7,981 | ActionobjectrepositoryController.java.txt |
| 07/29/2010 06:00 PM | 8,118 | AgentactivityscheduletController.java.txt |
| 07/29/2010 06:00 PM | 7,657 | AgentcalloutController.java.txt |
| 07/29/2010 06:00 PM | 7,778 | AgentcallouthistoryController.java.txt |
| 07/29/2010 05:59 PM | 281 | Agentcallouts.java.txt |
| 07/29/2010 05:59 PM | 7,481 | AgentcostController.java.txt |
| 07/29/2010 05:59 PM | 7,559 | AgentdetailsController.java.txt |
| 07/29/2010 05:59 PM | 7,806 | AgentloginController.java.txt |
| 07/29/2010 05:59 PM | 7,791 | AgentproficiencyController.java.txt |
| 07/29/2010 06:00 PM | 7,518 | AgentscheduleController.java.txt |
| 07/29/2010 06:05 PM | 7,553 | AgentskilltController.java.txt |
| 07/29/2010 06:05 PM | 7,588 | BroconstraintsController.java.txt |
| 07/29/2010 06:04 PM | 8,108 | BusinessobjectrepositoryController.java.txt |
| 07/29/2010 06:04 PM | 8,000 | CalloutinfrastructuremController.java.txt |
| 07/29/2010 06:04 PM | 7,475 | ClientprofilemController.java.txt |
| 07/29/2010 06:04 PM | 7,537 | ClientprogramController.java.txt |
| 07/29/2010 06:04 PM | 866 | ConditionalCrud.java.txt |
| 07/29/2010 06:05 PM | 914 | Crud.java.txt |
| 07/29/2010 06:06 PM | 7,780 | DimCampaignController.java.txt |
| 07/29/2010 06:06 PM | 7,724 | GapanalysisController.java.txt |
| 07/29/2010 06:06 PM | 7,476 | HostedcompanymController.java.txt |
| 07/29/2010 06:06 PM | 7,973 | LogicaloperatormController.java.txt |
| 07/29/2010 06:06 PM | 7,820 | MaincategorymController.java.txt |
| 07/29/2010 06:06 PM | 7,630 | OperatounController.java.txt |
| 07/29/2010 06:05 PM | 7,734 | PopuptortcmessageController.java.txt |
| 07/29/2010 06:05 PM | 7,933 | ProgramrteController.java.txt |
| 07/29/2010 06:06 PM | 7,433 | ProgramwfmsController.java.txt |
| 07/29/2010 06:09 PM | 7,682 | RuleassociationsController.java.txt |
| 07/29/2010 06:09 PM | 7,329 | RulegroupController.java.txt |
| 07/29/2010 06:08 PM | 7,589 | RulerepositoryController.java.txt |
| 07/29/2010 06:08 PM | 7,656 | RulerepositorymController.java.txt |
| 07/29/2010 06:08 PM | 7,481 | SkillmController.java.txt |
| 07/29/2010 06:08 PM | 7,855 | SubcategorymController.java.txt |
| 07/29/2010 06:08 PM | 7,697 | SubskillmController.java.txt |
| 07/29/2010 06:08 PM | 7,933 | UserdetailController.java.txt |
| 07/29/2010 06:09 PM | 7,664 | UserroleController.java.txt |

-continued

| Created | Size | Name |
|---|---|---|
| Directory of d:\WorkFlex Manager Source Code (1)\com\workflex\dashboard | | |
| 07/29/2010 05:58 PM | 2,286 | AgentWeekData.java.txt |
| 07/29/2010 05:58 PM | 1,179 | CumulativeData.java.txt |
| 07/29/2010 05:58 PM | 10,180 | ResultCumulativeData.java.txt |
| 07/29/2010 05:58 PM | 2,058 | ResultData.java.txt |
| 07/29/2010 05:58 PM | 15,636 | RtcDashboardXml.java.txt |
| 07/29/2010 05:57 PM | 3,505 | SlotData.java.txt |
| 07/29/2010 05:57 PM | 5,726 | WeekDashboardXml.java.txt |
| Directory of d:\WorkFlex Manager Source Code (1)\com\workflex\filters | | |
| 07/29/2010 05:56 PM | 15,501 | RequestFilter.java.txt |
| Directory of d:\WorkFlex Manager Source Code (1)\com\workflex\popuptortc | | |
| 07/29/2010 05:56 PM | 1,657 | CheckEditRights.java.txt |
| 07/29/2010 05:55 PM | 4,380 | GetRtcUpdate.txt |
| 07/29/2010 05:55 PM | 7,241 | RuleExecutionCache.java.txt |
| 07/29/2010 05:55 PM | 2,508 | UpdateMsgStatus.java.txt |
| Directory of d:\WorkFlex Manager Source Code (1)\com\workflex\property | | |
| 07/29/2010 05:54 PM | 4,276 | PropertyLoader.java.txt |
| Directory of d:\WorkFlex Manager Source Code (1)\com\workflex\report | | |
| 07/29/2010 05:54 PM | 4,338 | ExceptionReport.java.txt |
| Directory of d:\WorkFlex Manager Source Code (1)\com\workflex\rule\object\action | | |
| 07/29/2010 05:47 PM | 10,489 | Agent.java.txt |
| 07/29/2010 05:47 PM | 1,214 | AgentParam.java.txt |
| 07/29/2010 05:47 PM | 27,452 | CalloutAgents.java.txt |
| 07/29/2010 05:47 PM | 7,516 | ChangeSkillQueue.java.txt |
| 07/29/2010 05:50 PM | 18,893 | CoachingAgent.java.txt |
| 07/29/2010 05:50 PM | 20,153 | FilterAgent.java.txt |
| 04/10/2010 07:47 PM | 120 | masteredb.properties |
| 07/29/2010 05:50 PM | 19,212 | MatchAgent.java.txt |
| 07/29/2010 05:50 PM | 24,699 | MonitorPopupAction.java.txt |
| 07/29/2010 05:50 PM | 7,537 | NotifyEmail.java.txt |
| 07/29/2010 05:49 PM | 47,580 | PopupToRtc.java.txt |
| 07/29/2010 05:49 PM | 8,942 | ScheduleTraining.java.txt |
| 07/29/2010 05:49 PM | 9,654 | SlaPenality.java.txt |
| 07/29/2010 05:49 PM | 16,686 | SortAgent.java.txt |
| 04/10/2010 07:47 PM | 166 | structuremap.properties |
| 07/29/2010 05:51 PM | 19,071 | TrainingAgent.java.txt |
| 07/29/2010 05:51 PM | 25,027 | VtoAgent.java.txt |
| 07/29/2010 05:52 PM | 9,005 | WagePremium.txt |
| Directory of d:\WorkFlex Manager Source Code (1)\com\workflex\rule\object\business | | |
| 07/29/2010 05:53 PM | 6,234 | AgentCoachingCompleted.java.txt |
| 07/29/2010 05:53 PM | 7,496 | AgentGap.java.txt |
| 07/29/2010 05:53 PM | 7,467 | AgentTrainingCompleted.java.txt |
| 07/29/2010 05:53 PM | 599 | FilterInterval.java.txt |
| 07/29/2010 05:53 PM | 7,902 | Overstaff.java.txt |
| 07/29/2010 05:53 PM | 7,750 | OverstaffPercent.java.txt |
| 07/29/2010 05:53 PM | 7,989 | Understaff.java.txt |
| 07/29/2010 05:52 PM | 7,872 | UnderstaffPercent.java.txt |
| Directory of d:\WorkFlex Manager Source Code (1)\com\workflex\schedule\job | | |
| 07/29/2010 05:45 PM | 7,132 | calculateAgentParams.java.txt |
| 07/29/2010 05:45 PM | 16,333 | CsvImportJob.java.txt |
| 07/29/2010 05:45 PM | 6,476 | CsvImportJob15Mins.java.txt |
| 07/29/2010 05:45 PM | 9,746 | CsvImportJob30Mins.java.txt |
| 07/29/2010 05:45 PM | 6,565 | CsvImportJobHalfHourly.java.txt |
| 07/29/2010 05:44 PM | 8,058 | ResultDataScheduler.java.txt |
| 07/29/2010 05:44 PM | 4,746 | RTCDashboardCal.java.txt |
| 07/29/2010 05:44 PM | 9,632 | SchedularService.java.txt |
| 07/29/2010 05:42 PM | 8,654 | WfmStatsJob.java.txt |
| Directory of d:\WorkFlex Manager Source Code (1)\com\workflex\sorting | | |
| 07/29/2010 05:40 PM | 5,302 | RuleGroupAssociationTestBy.java.txt |
| 07/29/2010 05:40 PM | 3,434 | ViewRules.java.txt |
| Directory of d:\WorkFlex Manager Source Code (1)\com\workflex\test | | |
| 07/29/2010 05:40 PM | 6,067 | CsvImportJobTest.java.txt |
| Directory of d:\WorkFlex Manager Source Code (1)\com\workflex\utils | | |
| 07/29/2010 05:28 PM | 1,200 | Commonfns.java.txt |
| 07/29/2010 05:28 PM | 4,696 | CsvImport.java.txt |
| 07/29/2010 05:28 PM | 753 | Csvmaker.java.txt |
| 07/29/2010 05:28 PM | 2,555 | HibernateUtils.java.txt |
| 07/29/2010 05:28 PM | 2,160 | MasterDatabaseUpdate.java.txt |
| 04/10/2010 07:49 PM | 120 | masteredb.properties |
| 07/29/2010 05:39 PM | 36,508 | PopulateDatabase.java.txt |
| 07/29/2010 05:30 PM | 1,026 | RuleDataCacheStatus.java.txt |
| 07/29/2010 05:29 PM | 8,750 | sendMail.java.txt |
| 07/29/2010 05:29 PM | 1,301 | Slots.java.txt |
| 07/29/2010 05:39 PM | 4,450 | StreamWriter.java.txt |
| 04/10/2010 07:49 PM | 166 | structuremap.properties |
| 07/29/2010 05:40 PM | 255 | url.java.txt |
| 07/29/2010 05:39 PM | 8,001 | Utils.java.txt |
| 07/29/2010 05:39 PM | 1,581 | WorkflexDateUtils.java.txt |
| Directory of d:\WorkFlex Manager Source Code (1)\com\workflex\wfm\report | | |
| 07/29/2010 05:20 PM | 6,263 | CalendarUtil.java.txt |
| 07/29/2010 05:20 PM | 1,090 | ExtendedHourBean.java.txt |
| 07/29/2010 05:21 PM | 7,922 | ExtentedHourReport.java.txt |
| 07/29/2010 05:21 PM | 707 | StaffPlanBean.java.txt |
| 07/29/2010 05:21 PM | 6,365 | StaffPlaningReport.java.txt |
| 07/29/2010 05:21 PM | 3,128 | WeekReport.java.txt |
| 07/29/2010 05:21 PM | 1,713 | WeekReportBean.java.txt |
| Directory of d:\WorkFlexManager Sourcecode (2)\WorkFlexManager Sourcecode | | |
| 08/08/2011 03:04 PM | 8,757 | AC_OETagsjs.txt |
| 08/08/2011 04:17 PM | 7,844 | addbu.txt |
| 08/08/2011 04:18 PM | 5,167 | addclient.txt |
| 08/08/2011 04:19 PM | 9,014 | addcompaign.txt |
| 08/08/2011 04:19 PM | 4,416 | addprogram.html.txt |
| 08/08/2011 04:19 PM | 15,276 | addprogrammu.txt |
| 08/08/2011 04:20 PM | 1,630 | addrtc.txt |
| 08/08/2011 04:19 PM | 3,180 | addrtc1.txt |
| 08/08/2011 04:20 PM | 10,455 | addrulegroupassociation.txt |
| 08/08/2011 04:20 PM | 6,197 | addsite.txt |
| 08/08/2011 04:21 PM | 4,262 | addskill.txt |
| 08/08/2011 04:21 PM | 7,882 | adduser.txt |
| 08/08/2011 04:21 PM | 17,420 | addviewadminClient.txt |
| 08/08/2011 04:21 PM | 5,239 | agentcalloutreport.txt |
| 08/08/2011 04:21 PM | 4,563 | agentcalloutreportonboard.txt |
| 08/08/2011 04:22 PM | 5,977 | agentnoresponsereport.txt |
| 08/08/2011 04:22 PM | 8,375 | agentpreferences.txt |
| 08/08/2011 04:22 PM | 9,630 | agentpreferencesassociate.txt |
| 08/08/2011 04:22 PM | 27,109 | agentreport.txt |
| 08/08/2011 03:07 PM | 11,346 | agentreportprint.txt |
| 08/08/2011 04:22 PM | 4,853 | agentvtoreport.txt |
| 08/08/2011 04:22 PM | 4,441 | agentvtoreportonboard.txt |
| 08/08/2011 04:23 PM | 21,445 | associaterule.txt |
| 08/08/2011 04:23 PM | 8,280 | castats.txt |
| 08/08/2011 04:23 PM | 3,541 | castatsdetail.txt |
| 01/05/2011 05:57 AM | 7,701 | castats_old.txt |
| 08/08/2011 03:11 PM | 3,012 | changeparam.css.txt |
| 08/08/2011 04:23 PM | 1,173 | checknewmessage.txt |
| 08/08/2011 04:23 PM | 770 | checkrulegroupassociate.txt |
| 08/08/2011 04:24 PM | 540 | chkobjects.txt |
| 08/08/2011 04:24 PM | 4,665 | clientadmin.txt |
| 08/08/2011 04:24 PM | 2,848 | clientbu.js.txt |
| 08/08/2011 04:24 PM | 6,695 | clientheadermenu.txt |
| 08/08/2011 04:24 PM | 850 | clientnamexml.txt |
| 08/08/2011 04:25 PM | 25,387 | configbu.txt |
| 08/08/2011 04:25 PM | 24,748 | configbuervice.txt |
| 08/08/2011 03:17 PM | 22,169 | configbuervicewfm.txt |
| 08/08/2011 03:18 PM | 9,461 | configdb.txt |
| 08/08/2011 04:25 PM | 12,372 | configprograms.txt |
| 08/08/2011 03:19 PM | 8,748 | configureagent.txt |
| 08/08/2011 03:21 PM | 6,868 | configureallagent.txt |
| 08/08/2011 03:22 PM | 14,132 | configurebu.txt |
| 08/08/2011 03:22 PM | 23,144 | copyrule.txt |
| 08/08/2011 03:23 PM | 2,994 | createrule.css.txt |
| 08/08/2011 03:23 PM | 24,674 | createrule.js.txt |
| 08/08/2011 04:26 PM | 27,006 | createrule.txt |
| 08/08/2011 04:26 PM | 7,019 | createrulemgmt.txt |
| 08/08/2011 04:27 PM | 18,951 | createrulemgmtassociate.txt |
| 01/05/2011 05:57 AM | 20,139 | createrule_old.txt |
| 08/08/2011 04:27 PM | 2,584 | dailydataimport.txt |
| 08/08/2011 04:27 PM | 15,939 | dayreport.txt |
| 08/08/2011 04:27 PM | 876 | deidetails.txt |
| 08/08/2011 04:27 PM | 499 | deletertemsg.txt |
| 08/08/2011 04:27 PM | 754 | deletetestlog.txt |
| 08/08/2011 04:28 PM | 7,239 | editclient.txt |
| 08/08/2011 04:28 PM | 10,566 | editcompainview.txt |
| 08/08/2011 03:27 PM | 24,505 | editconfigbu.txt |

-continued

| Created | Size | Name |
|---|---|---|
| 08/08/2011 04:28 PM | 4,650 | editrtc.txt |
| 08/08/2011 04:29 PM | 26,554 | editrule.txt |
| 08/08/2011 04:29 PM | 14,429 | editrulegroupassociation.txt |
| 08/08/2011 04:29 PM | 8,340 | editsite.txt |
| 08/08/2011 04:29 PM | 4,402 | editskill.txt |
| 08/08/2011 04:30 PM | 13,196 | editsupervisor.txt |
| 08/08/2011 04:30 PM | 8,903 | edituser.txt |
| 08/08/2011 04:30 PM | 30,305 | exceptioncodesassociate.txt |
| 08/08/2011 04:30 PM | 22,163 | exceptionreport.txt |
| 08/08/2011 04:30 PM | 5,641 | exceptionrport.txt |
| 08/08/2011 04:30 PM | 1,172 | existclientandskillxml.txt |
| 08/08/2011 04:31 PM | 1,793 | existprogramxmllist.txt |
| 08/08/2011 04:31 PM | 2,190 | exReport.txt |
| 08/08/2011 04:31 PM | 19,151 | extendedhourreport.txt |
| 08/08/2011 04:31 PM | 4,133 | extendedhourrport.txt |
| 01/05/2011 05:57 AM | 3,624 | finaladdbu.html.txt |
| 01/05/2011 05:57 AM | 539,054 | finaladdbu.swf |
| 03/17/2011 05:39 AM | 291 | footer.txt |
| 08/08/2011 04:31 PM | 819 | forcastruleparser.txt |
| 01/05/2011 05:57 AM | 513 | generateXL.txt |
| 08/08/2011 03:30 PM | 606 | getresposelist.txt |
| 08/08/2011 04:31 PM | 1,593 | getrtcmsg.txt |
| 08/08/2011 04:32 PM | 1,372 | getrtcupdate.txt |
| 08/08/2011 04:32 PM | 1,192 | getrtcupdatehistory.txt |
| 08/08/2011 04:32 PM | 608 | getruledetail.txt |
| 08/08/2011 03:31 PM | 3,100 | getruleversiondetail.txt |
| 08/08/2011 04:32 PM | 1,570 | header.txt |
| 08/08/2011 04:31 PM | 17,721 | headermenu.txt |
| 08/08/2011 03:33 PM | 8,296 | index.txt |
| 08/08/2011 04:32 PM | 917 | insertreportData.txt |
| 08/08/2011 04:32 PM | 5,597 | login.txt |
| 08/08/2011 04:33 PM | 592 | mailtest.txt |
| 08/08/2011 03:34 PM | 563 | manualshrink.txt |
| 08/08/2011 04:33 PM | 4,102 | msghistoryslist.txt |
| 01/05/2011 05:57 AM | 7,034 | notificationmsg.old.txt |
| 08/08/2011 04:33 PM | 10,320 | notificationmsg.txt |
| 01/05/2011 05:57 AM | 348 | oicalculations.txt |
| 08/08/2011 04:33 PM | 10,583 | onshiftagents.txt |
| 08/08/2011 04:34 PM | 24,728 | parameters.txt |
| 08/08/2011 04:34 PM | 4,619 | parsertest.txt |
| 08/08/2011 04:34 PM | 1,645 | parsertestcache.txt |
| 08/08/2011 04:34 PM | 6,717 | printagentreport.txt |
| 08/08/2011 03:37 PM | 4,045 | printdayreport.txt |
| 08/08/2011 04:34 PM | 25,822 | printweekreport.old.txt |
| 08/08/2011 03:37 PM | 25,143 | printweekreport.txt |
| 08/08/2011 04:34 PM | 15,276 | programs.txt |
| 08/08/2011 04:35 PM | 1,161 | programxml.txt |
| 08/08/2011 04:35 PM | 2,874 | programxmllist.txt |
| 08/08/2011 04:35 PM | 834 | removepopupmsg.txt |
| 08/08/2011 04:35 PM | 472 | removesessionchangeruleparam.txt |
| 08/08/2011 04:35 PM | 5,665 | resetpwd.txt |
| 08/08/2011 04:36 PM | 6,428 | reviewruleoption.txt |
| 01/05/2011 05:57 AM | 6,516 | reviewruleoptiondata.txt |
| 08/08/2011 03:40 PM | 6,414 | rollbackrule.txt |
| 01/05/2011 05:57 AM | 14,492 | rtc.old.txt |
| 08/08/2011 03:40 PM | 66,736 | rtc.txt |
| 08/08/2011 03:41 PM | 33,416 | rtcagentcalloutreport.txt |
| 08/08/2011 03:42 PM | 23,323 | rtcagentnoresponsereport.txt |
| 08/08/2011 03:42 PM | 22,087 | rtcagentstatisticsreport.txt |
| 08/08/2011 04:36 PM | 33,172 | rtcagenttvtoreport.txt |
| 08/08/2011 04:36 PM | 1,328 | rtccumulativedata.txt |
| 08/08/2011 04:36 PM | 110,462 | rtcdashboard.txt |
| 08/08/2011 03:43 PM | 4,388 | rtcdashborad.html.txt |
| 08/08/2011 04:37 PM | 1,517 | rtcday.txt |
| 08/08/2011 04:37 PM | 16,050 | rtcdayreport.txt |
| 08/08/2011 04:37 PM | 22,210 | rtcexceptionreport.txt |
| 08/08/2011 04:37 PM | 4,204 | rtcexceptionslist.txt |
| 08/08/2011 03:44 PM | 27,156 | rtcextendedhourreport.txt |
| 08/08/2011 04:37 PM | 9,051 | rtcgrid.txt |
| 08/08/2011 04:37 PM | 1,870 | rtcheader.txt |
| 08/08/2011 04:38 PM | 2,032 | rtclastperioddata.txt |
| 08/08/2011 04:38 PM | 862 | rtcreportxml.txt |
| 08/08/2011 04:38 PM | 11,888 | rtcresult.txt |
| 08/08/2011 04:38 PM | 1,525 | rtcresultdatamonth.txt |
| 08/08/2011 04:38 PM | 1,506 | rtcresultdatatoday.txt |
| 08/08/2011 04:38 PM | 1,792 | rtcslotdata.txt |
| 08/08/2011 04:38 PM | 21,718 | rtcstaffplaningreport.txt |
| 08/08/2011 04:39 PM | 4,398 | rtcweek.txt |
| 08/08/2011 04:39 PM | 9,332 | rtcweekgrid.txt |
| 08/08/2011 04:39 PM | 18,524 | rtcweekreport.txt |
| 08/08/2011 04:39 PM | 2,243 | rtcweekslotdata.txt |
| 08/08/2011 04:39 PM | 2,128 | rtcweekxml.txt |
| 08/08/2011 04:39 PM | 2,100 | rtcweekxmljs.txt |
| 08/08/2011 04:39 PM | 5,911 | rulegroupassociationdeploy.txt |
| 08/08/2011 04:39 PM | 28,130 | rulegroupassociationtestby.txt |
| 08/08/2011 04:40 PM | 6,709 | rulesassociations.txt |
| 08/08/2011 04:39 PM | 2,654 | rulesassociations1.txt |
| 08/08/2011 03:50 PM | 2,051 | ruleslibary.txt |
| 08/08/2011 03:51 PM | 3,490 | ruletest.css.txt |
| 08/08/2011 04:40 PM | 13,915 | ruletests.txt |
| 08/08/2011 04:40 PM | 18,768 | ruleversions.txt |
| 08/08/2011 04:40 PM | 18,437 | ruleversions_old.txt |
| 08/08/2011 04:41 PM | 975 | runruleshowrule.txt |
| 08/08/2011 04:41 PM | 80,564 | sendmail.txt |
| 08/08/2011 04:41 PM | 24,733 | setparameters.txt |
| 08/08/2011 03:52 PM | 683 | setrulelibarypopup.txt |
| 08/08/2011 04:41 PM | 21,945 | setruleparameter.js.txt |
| 08/08/2011 04:41 PM | 15,887 | setruleparameter.txt |
| 08/08/2011 04:42 PM | 3,497 | setslotrange.txt |
| 08/08/2011 04:42 PM | 8,021 | showdei.txt |
| 08/08/2011 04:42 PM | 596 | showrulexml.txt |
| 08/08/2011 04:42 PM | 824 | skillnamexml.txt |
| 08/08/2011 04:42 PM | 1,448 | sliding_popup.js.txt |
| 08/08/2011 04:42 PM | 21,717 | staffplaningreport.txt |
| 08/08/2011 03:55 PM | 14,808 | staffreport.old.txt |
| 08/08/2011 04:43 PM | 13,505 | staffreport.txt |
| 08/08/2011 04:43 PM | 4,621 | statisticsreport.txt |
| 08/08/2011 03:55 PM | 4,876 | style.css.txt |
| 08/08/2011 04:44 PM | 7,090 | submitaddbu.txt |
| 08/08/2011 04:44 PM | 7,138 | submitaddprogrammu.txt |
| 08/08/2011 04:44 PM | 7,972 | submitassociaterule.txt |
| 08/08/2011 04:44 PM | 526 | submitcreaterule.txt |
| 08/08/2011 04:44 PM | 7,916 | submitprogramlist.txt |
| 08/08/2011 04:44 PM | 10,498 | supervisor.txt |
| 08/08/2011 04:45 PM | 5,252 | supervisoremailsetting.txt |
| 08/08/2011 04:45 PM | 2,604 | supervisorheadermenu.txt |
| 01/05/2011 05:57 AM | 1,794 | test.html.txt |
| 08/08/2011 04:45 PM | 18,007 | testchangeruleparameter.txt |
| 08/08/2011 04:45 PM | 24,738 | testsetparameters.txt |
| 08/08/2011 04:00 PM | 4,281 | thikbox.css.txt |
| 08/08/2011 04:01 PM | 13,932 | ui.core.js.txt |
| 01/05/2011 05:57 AM | 29,063 | ui.draggable.js.txt |
| 01/05/2011 05:57 AM | 9,373 | ui.droppable.js.txt |
| 01/05/2011 05:57 AM | 38,040 | ui.sortable.js.txt |
| 08/08/2011 04:45 PM | 2,230 | updatemsgstatus.txt |
| 01/05/2011 05:57 AM | 934 | updateonsiftagents.txt |
| 08/08/2011 04:02 PM | 17,478 | viewclient.txt |
| 08/08/2011 04:02 PM | 9,348 | viewconfig.txt |
| 08/08/2011 04:02 PM | 10,917 | viewexceptioncodes.txt |
| 08/08/2011 04:02 PM | 6,164 | viewrulegroup.txt |
| 08/08/2011 04:46 PM | 12,545 | viewrules.txt |
| 08/08/2011 04:46 PM | 10,641 | viewsite.txt |
| 08/08/2011 04:46 PM | 11,614 | viewskill.txt |
| 08/08/2011 04:46 PM | 16,810 | viewsupervisor.txt |
| 08/08/2011 04:47 PM | 6,684 | viewsupervisoremail.txt |
| 08/08/2011 04:47 PM | 7,279 | viewuserdetail.txt |
| 08/08/2011 04:47 PM | 17,799 | weekreport.txt |
| 08/08/2011 04:47 PM | 7,425 | wfmstats.txt |
| 08/08/2011 04:47 PM | 2,995 | wfmstatsdetail.txt |
| 01/05/2011 05:57 AM | 4,839 | XMLWriter-1.0.0.js.txt |

Directory of d:\WorkFlexManager Sourcecode (2)\WorkFlexManager Sourcecode\agent

| Created | Size | Name |
|---|---|---|
| 08/08/2011 04:47 PM | 38,575 | agent.txt |
| 08/08/2011 04:48 PM | 259 | footer.txt |
| 08/08/2011 04:48 PM | 777 | header.txt |
| 08/08/2011 04:48 PM | 5,149 | login.txt |

Directory of d:\WorkFlexManager Sourcecode (2)\WorkFlexManager Sourcecode\com\workflex\agent

| Created | Size | Name |
|---|---|---|
| 08/08/2011 08:28 PM | 5,506 | ActivateAgent.java.txt |
| 08/08/2011 08:27 PM | 2,470 | AgentDetails.java.txt |
| 08/08/2011 08:30 PM | 9,250 | AgentDetailUpdate.java.txt |
| 08/08/2011 08:31 PM | 5,919 | AgentLoginService.java.txt |
| 01/05/2011 05:57 AM | 2,122 | Auththenticator.java.txt |
| 07/15/2011 11:04 AM | 33,545 | DateUtility.java.txt |

-continued

| Created | Size | Name |
|---|---|---|
| 03/07/2011 03:17 AM | 2,443 | NotRespondingMessage.java.txt |
| 08/08/2011 08:37 PM | 1,049 | SlotPreference.java.txt |

Directory of d:\WorkFlexManager Sourcecode (2)\WorkFlexManager Sourcecode\com\workflex\alert\ruleengine

| Created | Size | Name |
|---|---|---|
| 08/08/2011 09:10 PM | 2,734 | DecisionEngine.java.txt |
| 08/08/2011 09:10 PM | 6,736 | RuleEngine.java.txt |
| 08/08/2011 09:10 PM | 13,946 | RuleParser.java.txt |
| 08/08/2011 09:10 PM | 9,465 | RuleParserTest.java.txt |
| 08/08/2011 09:10 PM | 4,368 | StartEngine.java.txt |

Directory of d:\WorkFlexManager Sourcecode (2)\WorkFlexManager Sourcecode\com\workflex\alert\ruleengine\object

| Created | Size | Name |
|---|---|---|
| 08/08/2011 09:10 PM | 1,980 | Action.java.txt |
| 08/08/2011 09:10 PM | 2,499 | ActionObject.java.txt |
| 08/08/2011 09:10 PM | 2,695 | BusinessObject.java.txt |
| 08/08/2011 09:10 PM | 8,509 | Condition.java.txt |
| 08/08/2011 09:10 PM | 805 | InvalidRuleObjectException.java.txt |
| 08/08/2011 09:11 PM | 1,126 | Node.java.txt |

Directory of d:\WorkFlexManager Sourcecode (2)\WorkFlexManager Sourcecode\com\workflex\api\callout

| Created | Size | Name |
|---|---|---|
| 07/22/2011 12:12 PM | 64,319 | CalloutManager.java.txt |
| 08/08/2011 09:01 PM | 1,403 | Schedule.java.txt |

Directory of d:\WorkFlexManager Sourcecode (2)\WorkFlexManager Sourcecode\com\workflex\blins

| Created | Size | Name |
|---|---|---|
| 08/08/2011 09:40 PM | 3,022 | ActionCall.java.txt |
| 08/08/2011 09:40 PM | 611 | ActionObject.java.txt |
| 08/08/2011 09:41 PM | 922 | BroObject.java.txt |
| 08/08/2011 09:42 PM | 834 | BroResultObject.java.txt |
| 08/08/2011 09:42 PM | 1,187 | ConditionObject.java.txt |
| 08/08/2011 09:43 PM | 1,483 | CreateRuleFromXml.java.txt |
| 08/08/2011 09:43 PM | 954 | EvalObject.java.txt |
| 01/05/2011 05:57 AM | 1,012 | IfObject.java.txt |
| 01/05/2011 05:57 AM | 22,750 | MyForcastRuleParser.java.txt |
| 01/31/2011 03:02 PM | 23,111 | MyRuleParser.java.txt |
| 01/05/2011 05:57 AM | 10,989 | MySmartRuleParser.java.txt |
| 08/08/2011 09:44 PM | 11,880 | RuleObject.java.txt |
| 08/08/2011 09:44 PM | 3,285 | UpdateObjectData.java.txt |
| 08/08/2011 09:45 PM | 4,298 | UpdateObjectDataFromXml.java.txt |

Directory of d:\WorkFlexManager Sourcecode (2)\WorkFlexManager Sourcecode\com\workflex\brms\changeparameter

| Created | Size | Name |
|---|---|---|
| 07/26/2011 08:06 AM | 58,351 | Changecalloutparam.java.txt |
| 07/27/2011 03:04 PM | 41,885 | ChangeVtoparam.java.txt |
| 08/08/2011 09:08 PM | 22,699 | MyChangeparamParser.java.txt |

Directory of d:\WorkFlexManager Sourcecode (2)\WorkFlexManager Sourcecode\com\workflex\brms\commons

| Created | Size | Name |
|---|---|---|
| 08/08/2011 09:14 PM | 944 | DateSlot.java.txt |
| 08/08/2011 09:15 PM | 1,431 | JDOMValidator.java.txt |
| 08/08/2011 09:16 PM | 4,931 | MyObjectCompare.java.txt |
| 08/08/2011 09:17 PM | 2,287 | NodeLister.java.txt |
| 08/08/2011 09:19 PM | 2,644 | ReadAssociatedRuleXml.java.txt |
| 08/08/2011 09:23 PM | 2,758 | ReadAssociatedTempRuleXml.java.txt |
| 08/08/2011 09:22 PM | 10,308 | Slots.java.txt |
| 08/08/2011 09:25 PM | 14,398 | Utils.java.txt |
| 01/05/2011 05:57 AM | 1,512 | WorkflexDateUtils.java.txt |
| 08/08/2011 09:26 PM | 4,272 | WriteIfc.java.txt |

Directory of d:\WorkFlexManager Sourcecode (2)\WorkFlexManager Sourcecode\com\workflex\brms\parser

| Created | Size | Name |
|---|---|---|
| 08/08/2011 09:32 PM | 6,165 | BackgroudParserOutput.java.txt |
| 06/09/2011 09:31 PM | 12,174 | BackgroundParseEngine.java.txt |
| 06/08/2011 05:32 AM | 8,861 | BackgroundRuleParser.java.txt |
| 08/08/2011 09:33 PM | 1,965 | ContextCleanup.java.txt |
| 08/08/2011 09:34 PM | 10,582 | ForcastParseEngine.java.txt |
| 01/05/2011 05:57 AM | 6,928 | ForcastRuleParser.java.txt |
| 01/05/2011 05:57 AM | 8,059 | ParseEngineTest.java.txt |
| 08/08/2011 09:35 PM | 21,179 | RuleParser.java.txt |
| 01/25/2011 09:21 AM | 9,753 | RuleParserTest.java.txt |
| 08/08/2011 09:36 PM | 2,611 | RunningCleanup.java.txt |
| 01/06/2011 05:41 AM | 739 | RunParserBean.java.txt |
| 01/31/2011 06:04 AM | 9,187 | RunParserServlet.java.txt |
| 01/28/2011 06:08 AM | 9,311 | RunRtcParserServlet.java.txt |
| 01/05/2011 05:57 AM | 7,972 | RuntimeParseEngine.java.txt |
| 01/05/2011 05:57 AM | 9,326 | RuntimeRuleParser.java.txt |
| 01/05/2011 05:57 AM | 2,089 | ThreadTest.java.txt |
| 08/08/2011 09:32 PM | 4,080 | ViewRuleList.java.txt |

Directory of d:\WorkFlexManager Sourcecode (2)\WorkFlexManager Sourcecode\com\workflex\brms\parser\smart

| Created | Size | Name |
|---|---|---|
| 08/08/2011 09:27 PM | 1,183 | GapAnalysisObj.java.txt |
| 07/21/2011 01:19 PM | 25,986 | SmartParser.java.txt |
| 08/08/2011 09:29 PM | 14,273 | SmartParserSinglton.java.txt |

Directory of d:\WorkFlexManager Sourcecode (2)\WorkFlexManager Sourcecode\com\workflex\brms\test

| Created | Size | Name |
|---|---|---|
| 08/08/2011 09:38 PM | 23,876 | MyTestRuleParser.java.txt |
| 08/08/2011 09:38 PM | 35,697 | PerticularTestRuleParser.java.txt |
| 08/08/2011 09:39 PM | 4,479 | TestChangeRuleParam.java.txt |

Directory of d:\WorkFlexManager Sourcecode (2)\WorkFlexManager Sourcecode\com\workflex\business

| Created | Size | Name |
|---|---|---|
| 08/08/2011 10:01 PM | 1,078 | CheckSkill.java.txt |
| 01/05/2011 05:57 AM | 9,148 | ClientProfileMaster.java.txt |
| 08/08/2011 09:56 PM | 5,939 | ClientProfileService.java.txt |
| 08/08/2011 09:57 PM | 6,210 | ClientSiteMaster.java.txt |
| 08/08/2011 09:57 PM | 5,797 | ClientSiteService.java.txt |
| 08/08/2011 09:58 PM | 3,997 | ComapainRecordDelet.java.txt |
| 06/02/2011 04:01 AM | 5,179 | SkillMaster.java.txt |
| 01/05/2011 05:57 AM | 4,993 | SkillService.java.txt |
| 08/08/2011 09:59 PM | 7,990 | SupervisorMaster.java.txt |
| 08/08/2011 09:59 PM | 7,693 | SupervisorService.java.txt |
| 08/08/2011 10:00 PM | 5,671 | UpdateOnshiftAgents.java.txt |

Directory of d:\WorkFlexManager Sourcecode (2)\WorkFlexManager Sourcecode\com\workflex\business\clientadmin

| Created | Size | Name |
|---|---|---|
| 08/08/2011 10:02 PM | 4,526 | AgentPreferenceRestore.java.txt |
| 08/08/2011 10:03 PM | 3,788 | CampaignWiseSites.java.txt |
| 01/05/2011 05:57 AM | 3,170 | Castats.java.txt |
| 08/08/2011 10:04 PM | 9,392 | ExceptionCode.java.txt |
| 08/08/2011 10:05 PM | 15,189 | ManageExceptionCodeServlet.java.txt |
| 08/08/2011 10:06 PM | 14,860 | Statistics.java.txt |
| 08/08/2011 10:07 PM | 7,785 | WeeklyShrinkAdjust.java.txt |
| 08/08/2011 10:07 PM | 6,770 | WeeklyShrinkAdjustServlet.java.txt |

Directory of d:\WorkFlexManager Sourcecode (2)\WorkFlexManager Sourcecode\com\workflex\business\rules

| Created | Size | Name |
|---|---|---|
| 08/08/2011 10:09 PM | 5,839 | AddBUService.java.txt |
| 08/08/2011 10:10 PM | 8,187 | AdduserCompain.java.txt |
| 08/08/2011 10:11 PM | 3,376 | AddUserMaster.java.txt |
| 06/15/2011 04:27 AM | 11,857 | AddUserService.java.txt |
| 08/08/2011 10:11 PM | 5,685 | Attribute.java.txt |
| 01/05/2011 05:57 AM | 1,070 | CheckObjects.java.txt |
| 08/08/2011 10:12 PM | 1,670 | CheckRuleGroup.java.txt |
| 08/08/2011 10:12 PM | 10,741 | CleintAdmin.java.txt |
| 08/08/2011 10:13 PM | 3,309 | Clientcampainview.java.txt |
| 08/08/2011 10:14 PM | 11,154 | ConfigBUService.java.txt |
| 08/08/2011 10:14 PM | 7,839 | ConfiguredbService.java.txt |
| 01/05/2011 05:57 AM | 2,911 | CreateBusinessRule.java.txt |
| 01/05/2011 05:57 AM | 3,197 | CreateRuleService.java.txt |
| 08/08/2011 10:15 PM | 6,403 | dbconfig1.java.txt |
| 08/08/2011 10:15 PM | 4,913 | DeployprogramNameService.java.txt |
| 08/08/2011 10:16 PM | 3,022 | EditConfigmuService.java.txt |
| 01/31/2011 11:22 AM | 7,283 | EditRuledisplay.java.txt |
| 08/08/2011 10:16 PM | 10,158 | EditUserService.java.txt |
| 08/08/2011 10:17 PM | 8,243 | Edituserviewcompaign.java.txt |
| 01/05/2011 05:57 AM | 903 | ExceptionCodes.java.txt |
| 01/05/2011 05:57 AM | 1,122 | Parameters.java.txt |
| 08/08/2011 10:17 PM | 13,553 | ProgramXmlList.java.txt |
| 08/08/2011 10:18 PM | 12,257 | ReadXmlFile.java.txt |
| 08/08/2011 10:18 PM | 1,598 | ReviewRule.java.txt |
| 08/08/2011 10:19 PM | 3,724 | ReviewRuleOption.java.txt |
| 08/08/2011 10:19 PM | 3,090 | ReviewRuleOptionBean.java.txt |
| 01/05/2011 05:57 AM | 17,784 | rollbackrule.java.txt |
| 08/08/2011 10:20 PM | 1,271 | RuleAssociations.java.txt |
| 08/08/2011 10:20 PM | 2,216 | RuleassociationsBean.java.txt |
| 06/09/2011 06:18 AM | 32,747 | RuleCompiler.java.txt |
| 08/08/2011 10:20 PM | 17,817 | RulegroupAssociate.java.txt |
| 08/08/2011 10:21 PM | 7,495 | RulegroupMaster.java.txt |
| 08/08/2011 10:21 PM | 6,554 | RulegroupService.java.txt |
| 08/08/2011 10:21 PM | 2,344 | RuleLibarayList.java.txt |
| 08/08/2011 10:22 PM | 1,852 | RuleLibrary.java.txt |
| 01/05/2011 05:57 AM | 19,535 | RuleSyntaxValidator.java.txt |
| 01/05/2011 05:57 AM | 5,007 | RuleVersion.java.txt |
| 01/05/2011 05:57 AM | 4,781 | RuleVersions.java.txt |
| 01/05/2011 05:57 AM | 1,822 | RuleVersionsData.java.txt |
| 01/05/2011 05:57 AM | 990 | RuleVersionsObj.java.txt |
| 01/05/2011 05:57 AM | 13,825 | RuleVersionUtils.java.txt |
| 08/08/2011 10:24 PM | 2,877 | SubmitAgentSkill.java.txt |
| 07/22/2011 04:09 PM | 12,955 | SubmitChangeRange.java.txt |
| 01/05/2011 05:57 AM | 22,881 | SubmitRule.java.txt |
| 04/27/2011 05:54 AM | 15,159 | SubmitsetparameterService.java.txt |
| 01/05/2011 05:57 AM | 10,125 | TestChangeParam.java.txt |

-continued

| Created | Size | Name |
|---|---|---|
| 01/05/2011 05:57 AM | 5,071 | TestRuleparser.java.txt |
| 01/05/2011 05:57 AM | 1,754 | UpdateAgentCost.java.txt |
| 01/05/2011 05:57 AM | 4,268 | ViewRuleVersion.java.txt |
| Directory of d:\WorkFlexManager Sourcecode (2)\WorkFlexManager Sourcecode\com\workflex\business\utils | | |
| 01/05/2011 05:57 AM | 1,209 | Commonfns.java.txt |
| 01/05/2011 05:57 AM | 11,463 | ExceptionCodeMappings.java.txt |
| 08/08/2011 09:48 PM | 2,505 | FileNotifier.java.txt |
| 01/05/2011 05:57 AM | 8,605 | MasterRecords.java.txt |
| 04/04/2011 06:33 AM | 43,845 | Sftp.java.txt |
| 08/08/2011 09:51 PM | 2,711 | SftpFileUploader.java.txt |
| 01/05/2011 05:57 AM | 990 | SyncFiles.java.txt |
| 08/08/2011 09:49 PM | 810 | TestListener.java.txt |
| 01/05/2011 05:57 AM | 27,898 | WritingRequestXml.java.txt |
| Directory of d:\WorkFlexManager Sourcecode (2)\WorkFlexManager Sourcecode\com\workflex\business\wfm | | |
| 01/05/2011 05:57 AM | 3,602 | ProgramWfms.java.txt |
| 01/05/2011 05:57 AM | 2,893 | RuleBean.java.txt |
| 06/20/2011 10:47 AM | 7,824 | Statistics.java.txt |
| 01/05/2011 05:57 AM | 1,813 | Wfmstats.java.txt |
| Directory of d:\WorkFlexManager Sourcecode (2)\WorkFlexManager Sourcecode\com\workflex\commons | | |
| 08/08/2011 04:48 PM | 4,555 | Auththenticator.java.txt |
| 08/08/2011 04:49 PM | 8,113 | LoginService.java.txt |
| 08/08/2011 04:51 PM | 2,861 | RtcLockingCalloutTriplets.java.txt |
| 08/08/2011 04:54 PM | 7,577 | RtcLockingService.java.txt |
| 08/08/2011 04:55 PM | 2,917 | RtcProgramCouplesLoggedInForExceptionsList.java.txt |
| 08/08/2011 04:57 PM | 2,914 | RtcProgramCouplesLoggedInForMessageHistory.java.txt |
| 08/08/2011 04:59 PM | 2,875 | SupervisorMail.java.txt |
| 08/08/2011 05:00 PM | 4,661 | User.java.txt |
| Directory of d:\WorkFlexManager Sourcecode (2)\WorkFlexManager Sourcecode\com\workflex\context | | |
| 08/08/2011 04:45 PM | 1,999 | ContextLoader.java.txt |
| 08/08/2011 04:46 PM | 2,005 | ContextLoaderListener.java.txt |
| 08/08/2011 04:46 PM | 2,629 | LoadConfiguration.java.txt |
| Directory of d:\WorkFlexManager Sourcecode (2)\WorkFlexManager Sourcecode\com\workflex\controllers | | |
| 08/08/2011 04:18 PM | 7,733 | ActionobjectparamController.java.txt |
| 08/08/2011 04:19 PM | 7,979 | ActionobjectrepositoryController.java.txt |
| 08/08/2011 04:19 PM | 7,546 | ActivitymController.java.txt |
| 08/08/2011 04:19 PM | 8,116 | AgentactivityscheduletController.java.txt |
| 08/08/2011 04:20 PM | 7,655 | AgentcalloutController.java.txt |
| 08/08/2011 04:20 PM | 7,776 | AgentcallouthistoryController.java.txt |
| 08/08/2011 04:22 PM | 7,479 | AgentcostController.java.txt |
| 08/08/2011 04:23 PM | 7,573 | AgentdetailsController.java.txt |
| 08/08/2011 04:23 PM | 7,804 | AgentloginController.java.txt |
| 08/08/2011 04:23 PM | 8,116 | AgentpreferencehistoryController.java.txt |
| 08/08/2011 04:23 PM | 7,789 | AgentproficiencyController.java.txt |
| 08/08/2011 04:24 PM | 7,516 | AgentscheduleController.java.txt |
| 08/08/2011 04:24 PM | 7,551 | AgentskilltController.java.txt |
| 08/08/2011 04:27 PM | 7,586 | BroconstraintsController.java.txt |
| 08/08/2011 04:29 PM | 8,108 | BusinessobjectrepositoryController.java.txt |
| 08/08/2011 04:32 PM | 7,998 | CalloutinfrastructuremController.java.txt |
| 08/08/2011 04:34 PM | 7,473 | ClientprofilemController.java.txt |
| 08/08/2011 04:35 PM | 864 | ConditionalCrud.java.txt |
| 08/08/2011 04:35 PM | 912 | Crud.java.txt |
| 08/08/2011 04:35 PM | 7,778 | DimCampaignController.java.txt |
| 08/08/2011 04:44 PM | 7,722 | GapanalysisController.java.txt |
| 08/08/2011 04:38 PM | 7,474 | HostedcompanymController.java.txt |
| 08/08/2011 04:38 PM | 7,971 | LogicaloperatormController.java.txt |
| 08/08/2011 04:38 PM | 7,818 | MaincategorymController.java.txt |
| 08/08/2011 04:39 PM | 4,529 | ManageOnShiftAgentsResponse.java.txt |
| 08/08/2011 04:39 PM | 7,628 | OperatormController.java.txt |
| 08/08/2011 04:39 PM | 7,732 | PopuptortemessageController.java.txt |
| 08/08/2011 04:40 PM | 7,931 | ProgramrtcController.java.txt |
| 08/08/2011 04:40 PM | 7,431 | ProgramwfmsController.java.txt |
| 08/08/2011 04:40 PM | 7,223 | ReportmController.java.txt |
| 08/08/2011 04:41 PM | 7,680 | RuleassociationsController.java.txt |
| 08/08/2011 04:41 PM | 7,327 | RulegroupController.java.txt |
| 08/08/2011 04:41 PM | 7,673 | RulerepositoryController.java.txt |
| 08/08/2011 04:41 PM | 7,654 | RulerepositorymController.java.txt |
| 08/08/2011 04:42 PM | 7,479 | SkillmController.java.txt |
| 08/08/2011 04:42 PM | 7,853 | SubcategorymController.java.txt |
| 08/08/2011 04:42 PM | 7,695 | SubskillmController.java.txt |
| 08/08/2011 04:44 PM | 7,931 | UserdetailController.java.txt |
| 08/08/2011 04:44 PM | 7,662 | UserroleController.java.txt |
| Directory of d:\WorkFlexManager Sourcecode (2)\WorkFlexManager Sourcecode\com\workflex\dashboard | | |
| 08/08/2011 04:10 PM | 2,272 | AgentWeekData.java.txt |
| 08/08/2011 04:11 PM | 1,177 | CumulativeData.java.txt |
| 08/08/2011 04:14 PM | 10,344 | ResultCumulativeData.java.txt |
| 08/08/2011 04:16 PM | 2,052 | ResultData.java.txt |
| 08/08/2011 04:16 PM | 51,489 | RtcDashboardXml.java.txt |
| 08/08/2011 04:17 PM | 3,800 | SlotData.java.txt |
| 08/08/2011 04:17 PM | 10,096 | WeekDashboardXml.java.txt |
| Directory of d:\WorkFlexManager Sourcecode (2)\WorkFlexManager Sourcecode\com\workflex\filters | | |
| 08/08/2011 09:57 PM | 15,370 | RequestFilter.java.txt |
| Directory of d:\WorkFlexManager Sourcecode (2)\WorkFlexManager Sourcecode\com\workflex\popuportc | | |
| 08/08/2011 09:52 PM | 1,654 | CheckEditRights.java.txt |
| 08/08/2011 09:53 PM | 35,145 | GetRtcUpdate.java.txt |
| 08/08/2011 09:54 PM | 25,098 | PopupContent.java.txt |
| 08/08/2011 09:55 PM | 2,187 | RemovePopupMessages.java.txt |
| 08/08/2011 09:55 PM | 7,841 | RuleExecutionCache.java.txt |
| 08/08/2011 09:56 PM | 15,007 | TimeIntervalCache.java.txt |
| 08/08/2011 09:56 PM | 12,643 | UpdateMsgStatus.java.txt |
| Directory of d:\WorkFlexManager Sourcecode (2)\WorkFlexManager Sourcecode\com\workflex\property | | |
| 08/08/2011 09:51 PM | 4,274 | PropertyLoader.java.txt |
| Directory of d:\WorkFlexManager Sourcecode (2)\WorkFlexManager Sourcecode\com\workflex\report | | |
| 08/08/2011 09:49 PM | 9,423 | ExceptionReport.java.txt |
| 08/08/2011 09:50 PM | 7,808 | ExceptionReportExport.java.txt |
| Directory of d:\WorkFlexManager Sourcecode (2)\WorkFlexManager Sourcecode\com\workflex\rule\object\action | | |
| 08/08/2011 10:05 PM | 34,261 | Agent.java.txt |
| 08/08/2011 10:12 PM | 3,453 | AgentBreakNotification.java.txt |
| 08/08/2011 10:13 PM | 492 | AgentComparator.java.txt |
| 08/08/2011 10:13 PM | 961 | AgentList.java.txt |
| 08/08/2011 10:02 PM | 1,901 | AgentParam.java.txt |
| 08/08/2011 10:06 PM | 852 | AgentShift.java.txt |
| 08/08/2011 10:14 PM | 4,230 | AlertAgent.java.txt |
| 08/08/2011 10:15 PM | 11,572 | Alertsuperwiser.java.txt |
| 08/08/2011 10:15 PM | 82,826 | CalloutAgents.java.txt |
| 08/08/2011 10:02 PM | 7,775 | ChangeSkillQueue.java.txt |
| 08/08/2011 10:16 PM | 19,474 | CoachingAgent.java.txt |
| 08/08/2011 10:16 PM | 21,575 | FilterAgent.java.txt |
| 08/08/2011 10:16 PM | 13,642 | FilterAgentByRule.java.txt |
| 08/08/2011 10:16 PM | 27,000 | MatchAgent.java.txt |
| 08/08/2011 10:16 PM | 11,726 | MonitorPopupAction.java.txt |
| 08/08/2011 10:17 PM | 7,529 | NotifyEmail.java.txt |
| 08/08/2011 10:18 PM | 8,349 | PopupTemplate.java.txt |
| 08/08/2011 10:18 PM | 356 | PopupToAgent.java.txt |
| 08/08/2011 10:18 PM | 102,617 | PopupToRtc.java.txt |
| 08/08/2011 10:18 PM | 8,029 | ScheduleTraining.java.txt |
| 08/08/2011 10:18 PM | 9,957 | SlaPenality.java.txt |
| 08/08/2011 10:19 PM | 17,213 | SortAgent.java.txt |
| 08/08/2011 10:19 PM | 4,187 | SortAgentByRule.java.txt |
| 08/08/2011 10:19 PM | 19,653 | TrainingAgent.java.txt |
| 08/08/2011 10:19 PM | 49,938 | VtoAgent.java.txt |
| 08/08/2011 10:20 PM | 12,367 | WagePremium.java.txt |
| Directory of d:\WorkFlexManager Sourcecode (2)\WorkFlexManager Sourcecode\com\workflex\rule\object\action\utils | | |
| 08/08/2011 10:20 PM | 507 | AgentComparator.java.txt |
| 08/08/2011 10:21 PM | 10,756 | CalloutUtils.java.txt |
| Directory of d:\WorkFlexManager Sourcecode (2)\WorkFlexManager Sourcecode\com\workflex\rule\object\business | | |
| 08/08/2011 08:41 PM | 4,818 | Agentacwcurrentday.java.txt |
| 08/08/2011 08:42 PM | 3,759 | Agentacwlasthour.java.txt |
| 08/08/2011 08:35 PM | 4,470 | Agentacwlastperiod.java.txt |
| 08/08/2011 08:45 PM | 4,427 | Agentacwpreviousday.java.txt |
| 08/08/2011 08:48 PM | 4,328 | Agentahtcurrentday.java.txt |
| 08/08/2011 08:50 PM | 3,533 | Agentahtlasthour.java.txt |
| 08/08/2011 08:52 PM | 4,446 | Agentahtlastperiod.java.txt |
| 08/08/2011 08:53 PM | 3,951 | Agentahtpreviousday.java.txt |
| 08/08/2011 08:56 PM | 4,987 | AgentAsacurrentday.java.txt |
| 08/08/2011 08:58 PM | 3,921 | AgentAsalasthour.java.txt |
| 08/08/2011 09:00 PM | 4,774 | AgentAsalastperiod.java.txt |
| 08/08/2011 09:01 PM | 4,344 | Agentasapreviousday.java.txt |
| 08/08/2011 09:04 PM | 4,247 | Agentcallscurrentday.java.txt |

-continued

| Created | Size | Name |
|---|---|---|
| 08/08/2011 09:06 PM | 3,462 | Agentcallslasthour.java.txt |
| 08/08/2011 09:08 PM | 4,471 | Agentcallslastperiod.java.txt |
| 08/08/2011 09:10 PM | 3,923 | Agentcallspreviousday.java.txt |
| 08/08/2011 09:12 PM | 5,883 | AgentCoachingCompleted.java.txt |
| 08/08/2011 09:14 PM | 10,739 | AgentGap.java.txt |
| 08/08/2011 09:16 PM | 5,121 | Agentnoofcallsanscurrentday.java.txt |
| 08/08/2011 09:18 PM | 4,034 | Agentnoofcallsanslasthour.java.txt |
| 08/08/2011 09:21 PM | 4,833 | Agentnoofcallsanslastperiod.java.txt |
| 08/08/2011 09:22 PM | 4,438 | Agentnoofcallsanspreviousday.java.txt |
| 08/08/2011 09:23 PM | 4,916 | AgentOccupancyCurrentday.java.txt |
| 08/08/2011 09:24 PM | 4,059 | AgentOccupancylasthour.java.txt |
| 08/08/2011 09:25 PM | 4,879 | AgentOccupancylastperiod.java.txt |
| 08/08/2011 09:26 PM | 4,348 | AgentOccupancypreviousday.java.txt |
| 08/08/2011 09:27 PM | 6,962 | AgentTrainingCompleted.java.txt |
| 08/08/2011 09:28 PM | 1,350 | Dayofmonth.java.txt |
| 08/08/2011 09:29 PM | 1,106 | Dayofweek.java.txt |
| 08/08/2011 09:32 PM | 536 | FilterInterval.java.txt |
| 08/08/2011 09:33 PM | 13,343 | Overstaff.java.txt |
| 08/08/2011 09:34 PM | 13,691 | OverstaffPercent.java.txt |
| 08/08/2011 09:36 PM | 4,382 | Programacwcurrentday.java.txt |
| 08/08/2011 09:37 PM | 3,209 | Programacwlasthour.java.txt |
| 08/08/2011 09:38 PM | 4,159 | Programacwlastperiod.java.txt |
| 08/08/2011 09:40 PM | 4,263 | Programacwpreviousday.java.txt |
| 08/08/2011 09:40 PM | 4,406 | Programahtcurrentday.java.txt |
| 08/08/2011 09:41 PM | 3,442 | Programahtlasthour.java.txt |
| 08/08/2011 09:42 PM | 4,354 | Programahtlastperiod.java.txt |
| 08/08/2011 09:43 PM | 4,168 | Programahtpreviousday.java.txt |
| 08/08/2011 09:44 PM | 4,272 | ProgramAsacurrentday.java.txt |
| 08/08/2011 09:45 PM | 3,636 | ProgramAsalasthour.java.txt |
| 08/08/2011 09:46 PM | 4,705 | ProgramAsalastperiod.java.txt |
| 08/08/2011 09:47 PM | 4,223 | ProgramAsapreviousday.java.txt |
| 08/08/2011 09:48 PM | 4,689 | Programcallscurrentday.java.txt |
| 08/08/2011 09:49 PM | 3,501 | Programcallslasthour.java.txt |
| 08/08/2011 09:50 PM | 4,322 | Programcallslastperiod.java.txt |
| 08/08/2011 09:51 PM | 4,504 | Programcallspreviousday.java.txt |
| 08/08/2011 09:52 PM | 4,542 | Programnoofcallsanscurrentday.java.txt |
| 08/08/2011 09:52 PM | 3,736 | Programnoofcallsanslasthour.java.txt |
| 08/08/2011 09:53 PM | 5,033 | Programnoofcallsanslastperiod.java.txt |
| 08/08/2011 09:53 PM | 4,573 | Programnoofcallsanspreviousday.java.txt |
| 08/08/2011 09:54 PM | 4,539 | ProgramOccupancycurrentday.java.txt |
| 08/08/2011 09:55 PM | 3,708 | ProgramOccupancylasthour.java.txt |
| 08/08/2011 09:55 PM | 4,698 | ProgramOccupancylastperiod.java.txt |
| 08/08/2011 09:56 PM | 4,295 | ProgramOccupancypreviousday.java.txt |
| 08/08/2011 09:57 PM | 1,726 | TimeOfDay.java.txt |
| 08/08/2011 09:57 PM | 13,392 | Understaff.java.txt |
| 08/08/2011 09:58 PM | 14,114 | UnderstaffPercent.java.txt |
| 08/08/2011 09:59 PM | 3,564 | UpcommingEvent.java.txt |

Directory of d:\WorkFlexManager Sourcecode (2)\WorkFlexManager Sourcecode\com\workflex\schedule\job

| Created | Size | Name |
|---|---|---|
| 08/08/2011 05:02 PM | 16,608 | calculateAgentParams.java.txt |
| 08/08/2011 05:03 PM | 6,154 | ConnectionBean.java.txt |
| 08/08/2011 05:03 PM | 27,233 | CsvImportJob.java.txt |
| 08/08/2011 05:03 PM | 6,488 | CsvImportJob15Mins.java.txt |
| 08/08/2011 05:04 PM | 9,755 | CsvImportJob30Mins.java.txt |
| 08/08/2011 05:04 PM | 6,577 | CsvImportJobHalfHourly.java.txt |
| 08/08/2011 05:06 PM | 2,662 | DailyDataServletImport.java.txt |
| 08/08/2011 05:07 PM | 9,224 | ResultDataScheduler.java.txt |
| 08/08/2011 05:08 PM | 4,782 | RTCDashboardCal.java.txt |
| 08/08/2011 05:09 PM | 10,612 | SchedularService.java.txt |
| 08/08/2011 05:10 PM | 22,268 | WfmStatsJob.java.txt |

Directory of d:\WorkFlexManager Sourcecode (2)\WorkFlexManager Sourcecode\com\workflex\sorting

| Created | Size | Name |
|---|---|---|
| 08/08/2011 05:11 PM | 5,302 | RuleGroupAssociationTestBy.java.txt |
| 08/08/2011 05:12 PM | 3,434 | ViewRules.java.txt |

Directory of d:\WorkFlexManager Sourcecode (2)\WorkFlexManager Sourceeode\com\workflex\utils

| Created | Size | Name |
|---|---|---|
| 08/08/2011 05:18 PM | 1,402 | ActiveProgramAgentScheduleStatistics.java.txt |
| 08/08/2011 05:19 PM | 5,525 | ActiveProgramStatistics.java.txt |
| 08/08/2011 05:23 PM | 20,067 | AgentShiftInfo.java.txt |
| 08/08/2011 05:25 PM | 14,480 | ClientTimeZone.java.txt |
| 08/08/2011 05:26 PM | 3,168 | ClientTimeZoneService.java.txt |
| 08/08/2011 05:27 PM | 7,514 | CsvImport.java.txt |
| 08/08/2011 05:27 PM | 1,257 | Csvmaker.java.txt |
| 08/08/2011 05:29 PM | 19,659 | DataEntryIndicator.java.txt |
| 08/08/2011 05:30 PM | 1,393 | DateFormatter.java.txt |
| 08/08/2011 05:31 PM | 2,486 | HibernateUtils.java.txt |
| 08/08/2011 05:31 PM | 91,990 | PopulateDatabase.java.txt |
| 08/08/2011 05:33 PM | 4,283 | ProgramUtils.java.txt |
| 08/08/2011 05:33 PM | 1,024 | RuleDataCacheStatus.java.txt |
| 08/08/2011 05:33 PM | 8,748 | sendMail.java.txt |
| 08/08/2011 05:34 PM | 2,529 | ServiceUtil.java.txt |
| 08/08/2011 05:35 PM | 2,089 | Slots.java.txt |
| 08/08/2011 05:35 PM | 4,460 | StreamWriter.java.txt |
| 08/08/2011 05:36 PM | 1,543 | TimeFormatter.java.txt |
| 08/08/2011 05:37 PM | 2,579 | TimeOutCheckjay.txt |
| 08/08/2011 05:37 PM | 2,579 | TimeOutCheck.java.txt |
| 08/08/2011 05:38 PM | 8,015 | Utils.jav.txt |
| 08/08/2011 05:38 PM | 8,015 | Utils.java.txt |
| 08/08/2011 05:38 PM | 1,579 | WorkflexDateUtils.java.txt |

Directory of d:\WorkFlexManager Sourcecode (2)\WorkFlexManager Sourcecode\com\workflex\wfm\report

| Created | Size | Name |
|---|---|---|
| 08/08/2011 09:41 PM | 10,956 | AgenCalloutReportExport.java.txt |
| 08/08/2011 08:32 PM | 4,474 | AgentCallout.java.txt |
| 08/08/2011 08:34 PM | 5,432 | AgentCalloutBean.java.txt |
| 08/08/2011 08:36 PM | 7,727 | AgentCalloutOnBoard.java.txt |
| 08/08/2011 08:37 PM | 13,901 | AgentCalloutReport.java.txt |
| 08/08/2011 08:43 PM | 9,706 | AgentCalloutReportPrint.java.txt |
| 08/08/2011 08:44 PM | 7,512 | AgentNoResponseReport.java.txt |
| 08/08/2011 08:46 PM | 8,632 | AgentNoResponseReportExport.java.txt |
| 08/08/2011 08:46 PM | 9,118 | AgentNoResponseReportPrint.java.txt |
| 08/08/2011 08:48 PM | 10,038 | AgentReport.java.txt |
| 08/08/2011 08:49 PM | 8,710 | AgentReportExport.java.txt |
| 08/08/2011 08:53 PM | 3,171 | AgentStatisticsBean.java.txt |
| 08/08/2011 08:53 PM | 9,657 | AgentStatisticsReport.java.txt |
| 08/08/2011 09:06 PM | 11,154 | AgentVtoReport.java.txt |
| 08/08/2011 09:09 PM | 8,681 | CalendarUtil.java.txt |
| 08/08/2011 09:10 PM | 11,892 | CalloutReportHeaderFooter.java.txt |
| 08/08/2011 09:43 PM | 6,152 | ConnectionBean.java.txt |
| 08/08/2011 09:43 PM | 14,508 | DayReport.java.txt |
| 08/08/2011 09:43 PM | 3,581 | DayReportBean.java.txt |
| 08/08/2011 09:17 PM | 11,445 | ExceptionReportHeaderFooter.java.txt |
| 08/08/2011 09:18 PM | 9,713 | ExceptionReportprint.java.txt |
| 08/08/2011 09:19 PM | 1,157 | ExtendedHourBean.java.txt |
| 08/08/2011 09:19 PM | 7,024 | ExtendedHourReportExport.java.txt |
| 08/08/2011 09:20 PM | 11,457 | ExtendedHourReportHeaderFooter.java.txt |
| 08/08/2011 09:21 PM | 7,513 | ExtendedHourReportPrint.java.txt |
| 08/08/2011 09:22 PM | 25,948 | ExtentedHourReport.java.txt |
| 08/08/2011 09:23 PM | 2,713 | NoResponseBean.java.txt |
| 08/08/2011 09:24 PM | 11,578 | NoResponseReportHeaderFooter.java.txt |
| 08/08/2011 09:24 PM | 835 | ProgramName.java.txt |
| 08/08/2011 09:25 PM | 3,565 | ProgramSiteType.java.txt |
| 08/08/2011 09:26 PM | 1,476 | ReportXml.java.txt |
| 08/08/2011 09:27 PM | 13,943 | ShrinkReport.java.txt |
| 08/08/2011 09:29 PM | 3,754 | StaffPlanBean.java.txt |
| 08/08/2011 09:30 PM | 17,635 | StaffPlaningReport.java.txt |
| 08/08/2011 09:31 PM | 16,377 | StaffPlaningReportExport.java.txt |
| 08/08/2011 09:31 PM | 17,086 | StaffPlaningReportPrint.java.txt |
| 08/08/2011 09:32 PM | 11,783 | StaffPlanningReportHeaderFooter.java.txt |
| 08/08/2011 09:34 PM | 17,010 | StaffReportPrint.java.txt |
| 08/08/2011 09:34 PM | 6,957 | StatisticsReportExport.java.txt |
| 08/08/2011 09:35 PM | 11,502 | StatisticsReportHeaderFooter.java.txt |
| 08/08/2011 09:36 PM | 7,630 | StatisticsReportPrint.java.txt |
| 08/08/2011 09:36 PM | 1,891 | testdate.java.txt |
| 08/08/2011 09:37 PM | 21,987 | WeeklyReportExport.java.txt |
| 08/08/2011 09:38 PM | 31,036 | WeeklyShrinkReport.java.txt |
| 08/08/2011 09:38 PM | 7,637 | WeekReport.java.txt |
| 08/08/2011 09:39 PM | 1,783 | WeekReportBean.java.txt |

Directory of d:\WorkFlexManager Sourcecode (2)\WorkFlexManager Sourcecode\js

| Created | Size | Name |
|---|---|---|
| 08/08/2011 04:49 PM | 2,163 | adduser.js.txt |
| 08/08/2011 04:49 PM | 4,677 | agentdetails.js.txt |
| 01/05/2011 05:57 AM | 10,186 | businessrule.bak.js.txt |
| 08/08/2011 04:49 PM | 12,572 | businessrule.js.txt |
| 08/08/2011 04:50 PM | 3,673 | businessrulecondition.js.txt |
| 08/08/2011 04:50 PM | 3,865 | businessrulecondition_.js.txt |
| 08/08/2011 04:50 PM | 3,539 | clientbu.js.txt |
| 08/08/2011 04:50 PM | 1,149 | clientselection.js.txt |
| 08/08/2011 04:50 PM | 9,986 | common.js.txt |
| 08/08/2011 04:14 PM | 31,864 | createrule.js.txt |
| 05/18/2011 11:20 AM | 5,412 | jquery.associaterule.js.txt |
| 01/05/2011 05:57 AM | 185 | jquery.ienav.js.txt |
| 05/02/2011 09:49 AM | 5,616 | jquery.tinyscrollbar.min.js.txt |

-continued

| Created | Size | Name |
|---|---|---|
| 05/02/2011 09:49 AM | 5,627 | jquery.tinyscrollbar1.min.js.txt |
| 06/24/2011 03:21 PM | 10,126 | jquery.validationEngine-en.js.txt |
| 06/24/2011 03:21 PM | 57,418 | jquery.validationEngine.js.txt |
| 01/05/2011 05:57 PM | 4,571 | LightBoxLite.js.txt |
| 08/08/2011 04:51 PM | 1,663 | resetpwd.js.txt |
| 08/08/2011 04:51 PM | 5,288 | rollbackrule.js.txt |
| 08/08/2011 04:51 PM | 1,181 | rtcjavascript.js.txt |
| 01/05/2011 05:57 AM | 3,392 | ruletest.css.txt |
| 08/08/2011 04:51 PM | 10,870 | ruletest.js.txt |
| 08/08/2011 04:51 PM | 1,487 | script.js.txt |
| 08/08/2011 04:52 PM | 27,736 | setruleparameter.js.txt |
| 08/08/2011 04:52 PM | 474 | slide.js.txt |
| 08/08/2011 04:52 PM | 18,362 | tabletask.js.txt |
| 08/08/2011 04:52 PM | 21,873 | tabletask_1.js.txt |
| 08/08/2011 04:53 PM | 21,344 | tabletask_1.js.txt |
| 08/08/2011 04:53 PM | 9,611 | test.js.txt |
| 08/08/2011 04:53 PM | 25,738 | testchangeruleparameter.js.txt |
| 08/08/2011 04:53 PM | 12,030 | thickbox.js.txt |
| 08/08/2011 04:54 PM | 13,432 | thikbox_1.js.txt |
| 01/05/2011 05:57 AM | 14,237 | thikbox_2.js.txt |
| 11/02/2010 02:49 AM | 13,974 | ui.corejs.txt |
| 01/05/2011 05:57 AM | 71,505 | ui.datepicker.js.txt |
| 11/02/2010 02:49 AM | 29,063 | ui.draggable.js.txt |
| 01/05/2011 05:57 AM | 16,552 | validate.js.txt |

BACKGROUND

To schedule large hourly workforces (for example call center agents), most companies utilize Workforce Management (WFM) software-based products that provide forecasting and scheduling capability. The forecasting capabilities typically utilize analytics against historical patterns of demand to predict future demand. An example of a typical WFM system architecture is shown in FIG. 1.

However, WFM systems have a limited ability to deal with situations where the actual demand or supply of agents differs from what has been forecast. For example, if the WFM system forecasts a demand of 200 agents for a given day, and schedules 200 agents accordingly, but the actual demand is 225 agents and only 175 show up to work, the system can do little to enable the company to adjust for the unexpected gap of 50 for that day, beyond offer reporting tools to track staffing level gaps.

Accordingly, there is a need in the art for improved workforce management technology.

SUMMARY

The technology disclosed herein can be used for a variety of purposes, including addressing the lack of ability in current WFM products to adjust for intraday staffing gaps. This can be achieved, for example, by an intraday staffing system that dynamically generates an optimized agent call-out list and wage offer based on business rules that have been preconfigured by the company. Of course, as will be apparent to those of ordinary skill in the art in light of this disclosure, the disclosed technology is susceptible of other implementations, and so the example described above should be understood as being illustrative only, and not limiting.

BRIEF DESCRIPTION OF THE DRAWINGS

The drawings and detailed description which follow are intended to be merely illustrative and are not intended to limit the scope of the invention as contemplated by the inventors.

DETAILED DESCRIPTION

Figure 1:
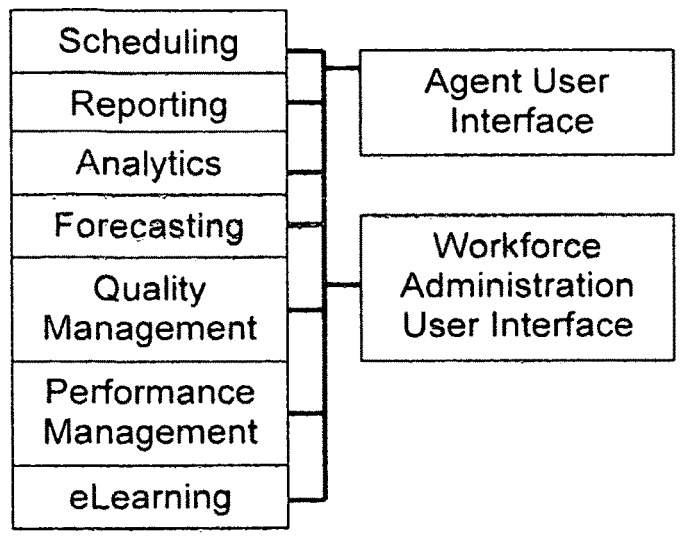
FIG. 1 depicts a typical WFM system architecture.
Figure 2:
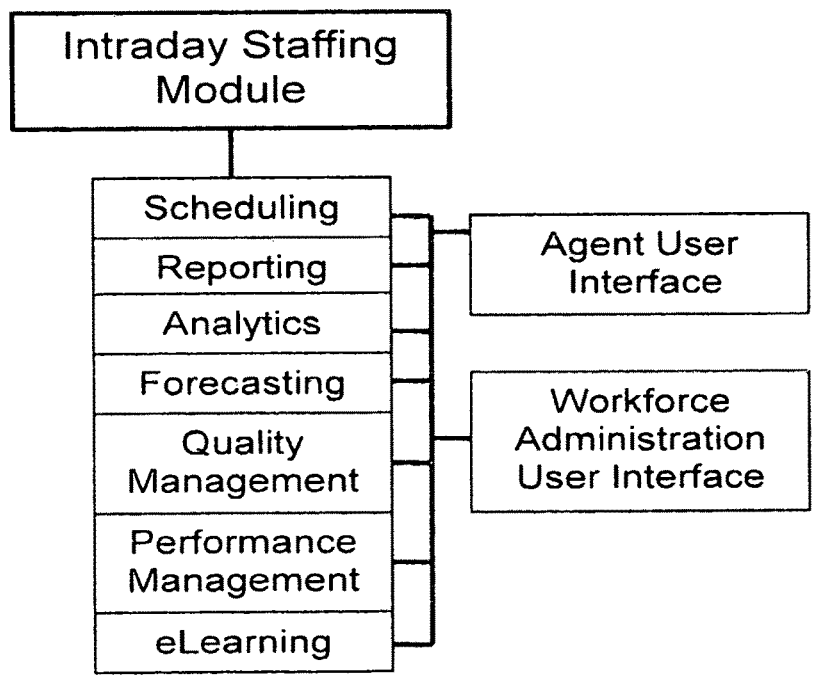
FIG. 2 depicts an exemplary high level enhanced WFM system architecture with intraday staffing engine.
Figure 7:
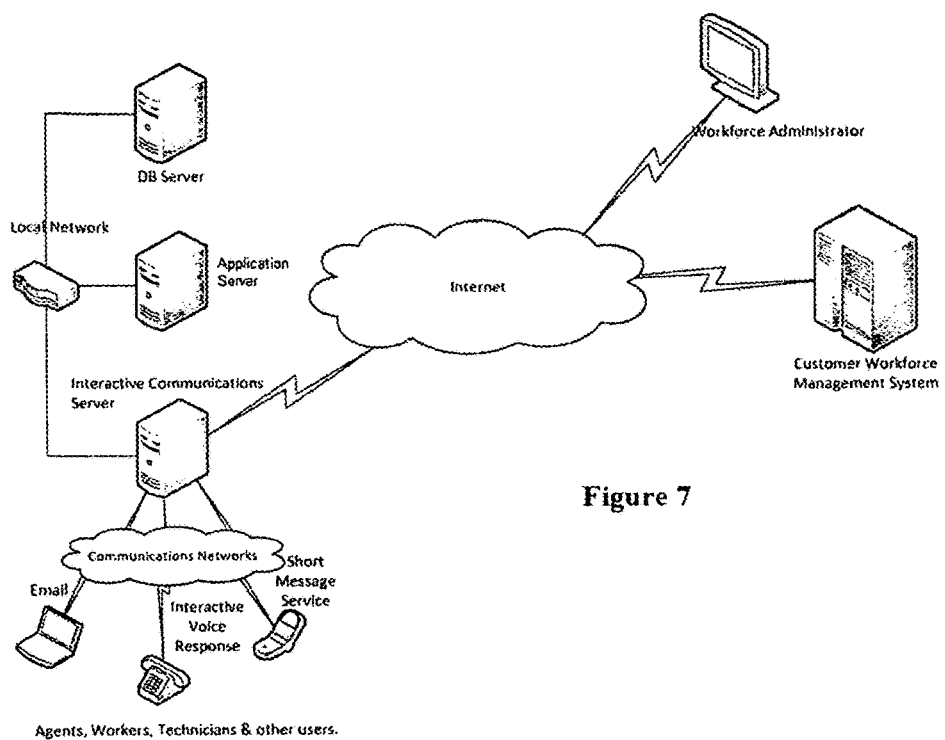
FIG. 7 depicts exemplary components which could be used in implementing the technology described herein.

Turning first to the figures, FIG. 2 depicts an exemplary high level enhanced WFM system architecture. As can be seen by comparison with the architecture shown in FIG. 1, the enhanced architecture differs from that typically available by the addition of an intraday staffing engine. Of course, it should be understood that the high level diagram of FIG. 2 is formatted for easy comparison with the typical architecture of FIG. 1, and that actual implementations would not necessarily share the structure shown in FIG. 2. As an example of this, consider the exemplary system architecture of FIG. 3, which provides an alternate approach to implementing the technology described herein. As will be apparent to one of ordinary skill in the art, such an architecture could be used with exemplary components such as shown in FIG. 7 to implement dynamic intraday scheduling.

Figure 3:
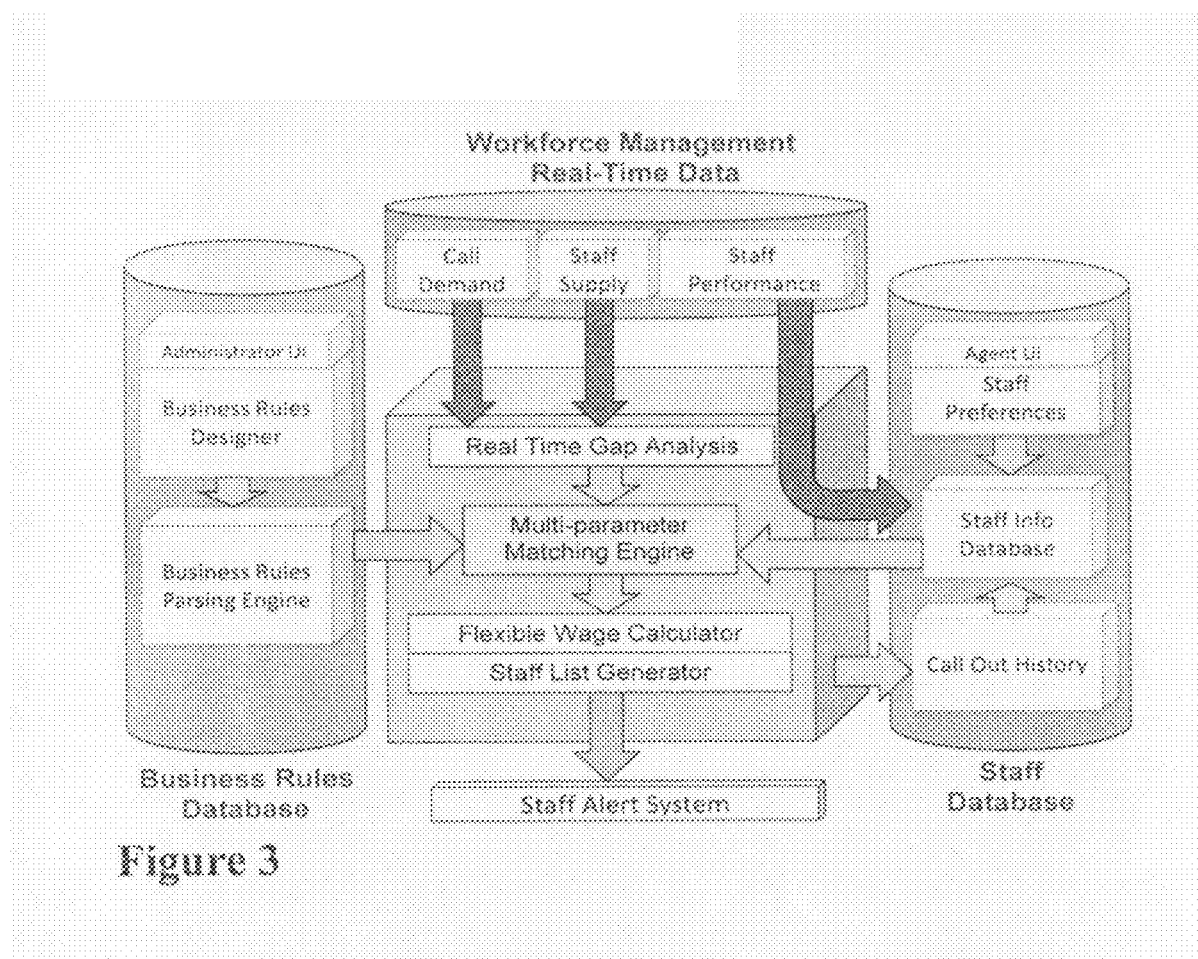
FIG. 3 depicts an exemplary system architecture which could be implemented using the disclosed technology.

As shown in the architecture of FIG. 3, the technology described herein could be illustrated in a system in which the heart of the system is a multi-parameter matching engine capable of processing and integrating feeds from a variety of sources. Such sources can include, for example:

Workforce Management Real-Time Data including Real Time Call Demand, Agent Supply, and Agent Performance information which can typically be extracted from the existing WFM system or telecom interface (e.g., PBX, ACD);

Business Rules Database that includes a business rules designer and business rules parsing engine that supports the aggregation of multiple predefined business rules; and Staff Database which contains staff specific information such as staff availability preferences, performance data and call out history (i.e., the acceptance rate of offers previously provided).

In some implementations, such a multi-parameter matching engine can use the real-time workforce management data to identify a staffing gap. It could then match this against rules that have been defined within the business rules database to determine what actions need to be taken (e.g., selection criteria for agents, and time-urgency of staffing needs) which would then be matched against the agent database to generate an optimized staff call out list and dynamic wage offer based on the criteria defined by the business rules database. This information could then be used by a staff alert system (e.g., email, voice-mail, mobile messaging) to contact the individuals and provide an offer to come for a previously unscheduled shift.

This allows dynamic calculation of a dynamic wage offering for intraday staffing, which is a functionality not previously known or available in the prior art. As an example, if the business rules database determines a time-urgency that requires 80% of offers to be accepted, the system will analyze previous acceptance rates at various staffing levels and generate a recommended wage level that has typically resulted in an 80% acceptance rate.

Figure 4:
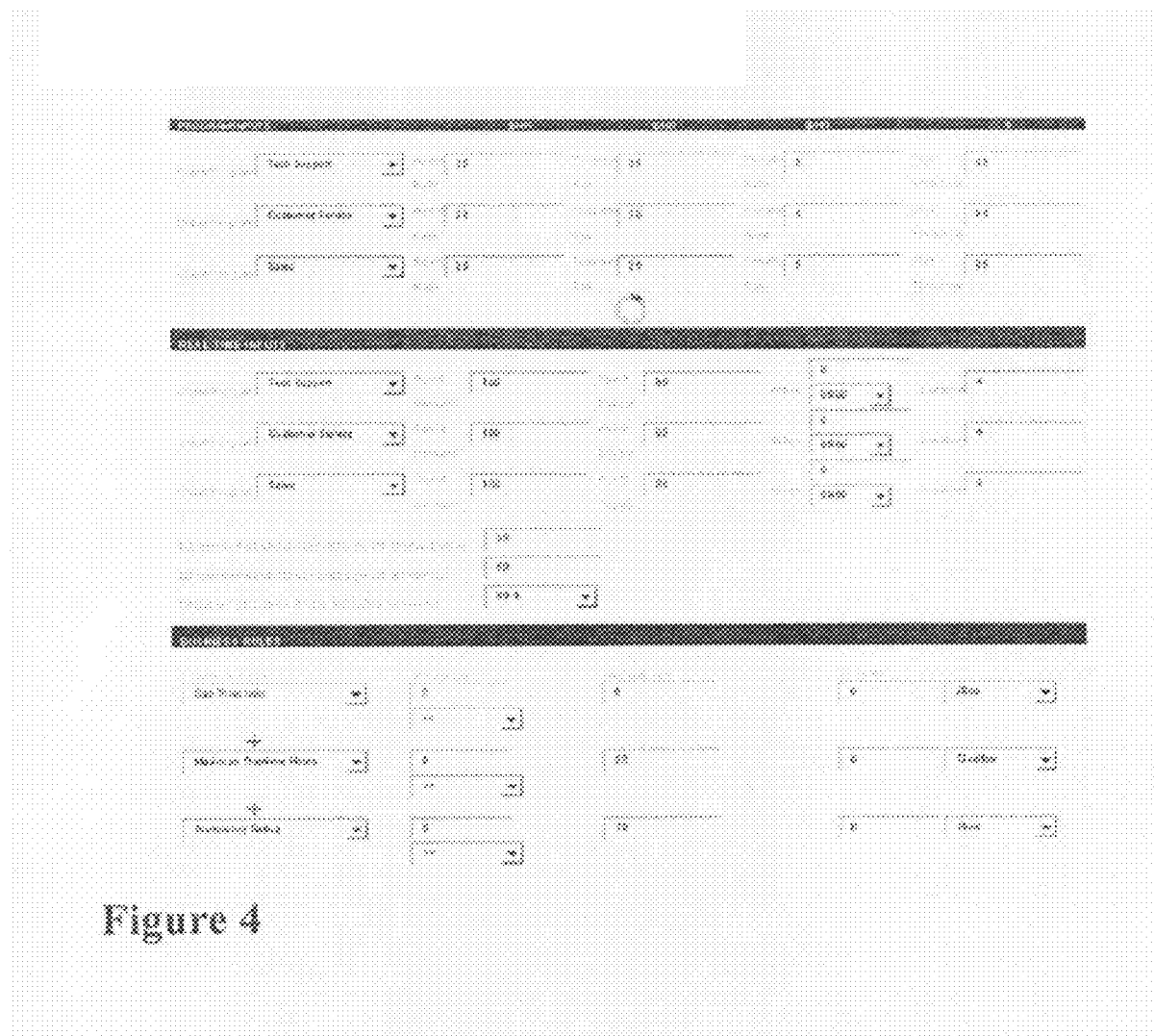
FIG. 4 depicts an exemplary input screen.

To illustrate how a solution powered by an architecture such as shown in FIG. 3 could be used in practice, consider an implementation in which a back end system having an architecture such as shown in FIG. 3 is used to power a web accessible input screen such as shown in FIG. 4. In such interfaces, there could be a program input portion which enables information various programs being supported, such as, in the case of FIG. 4, customer care, technical support and sales. For each program, information of the cost and revenue for each program can be input, including any contractual service level agreements that may be in place. There could also be a real time input section, which could be provided by an existing workforce management system and could provide details on staff supply, demand for a particular time window. This part of the screen could also allow operators to specify the maximum staff wage premiums they are willing to pay and the success rate they wish to achieve for "call outs". The system can be designed to use historical success rates and wages to dynamically calculate the wage to be offered what will achieve the desired success rate. There could also be a business rules section which could allow users to create rules on how they would like to respond to various situations. An example of a rule might be to trigger a search for on call staff if the gap is greater than 5 and then to look for available staff with a proficiency rating of 70/100 or better, excluding staff that have worked over 20 overtime hours that week already.

Figure 5:
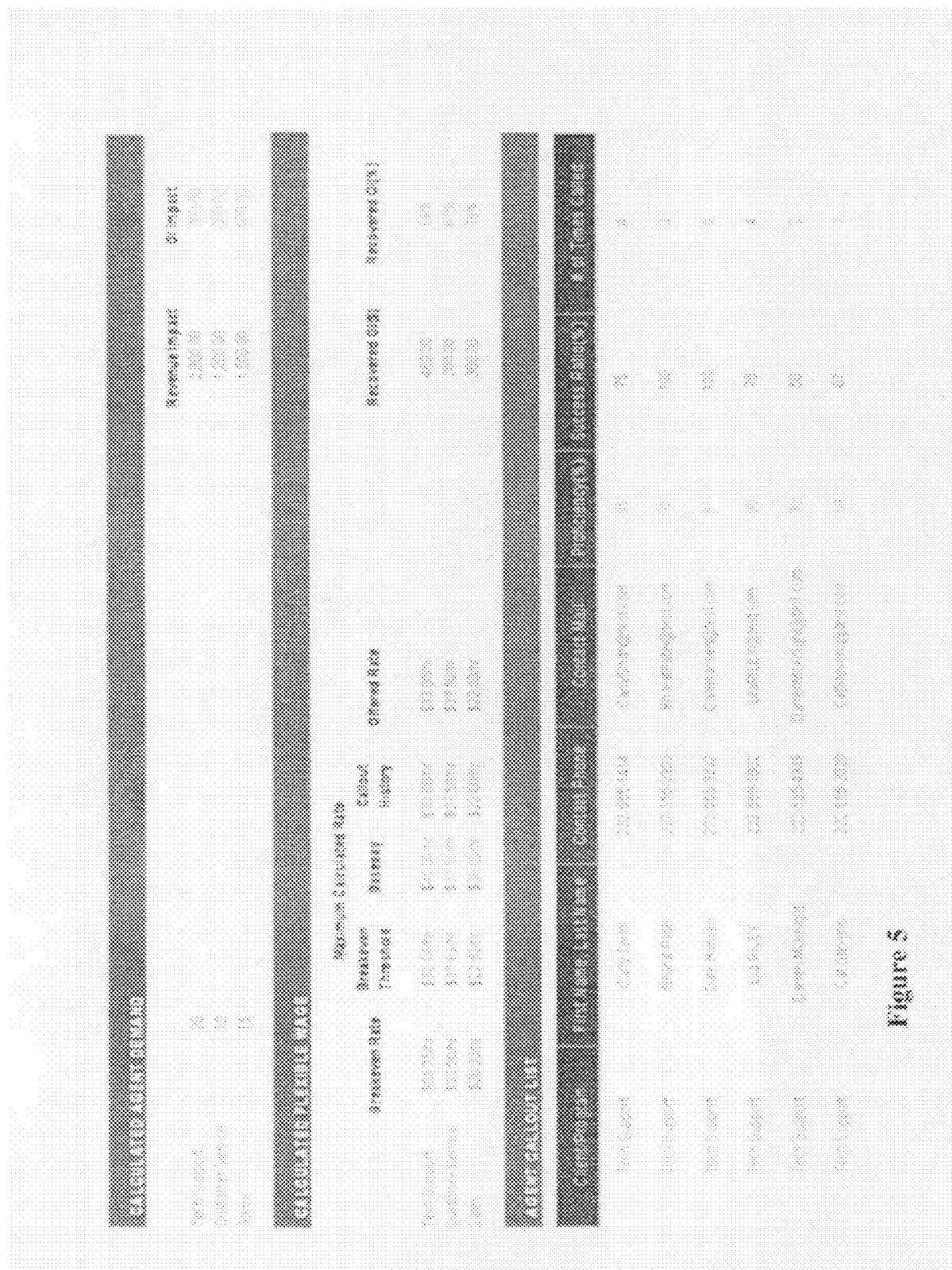
FIG. 5 depicts an exemplary output screen.

Of course, it should be understood that the interface of FIG. 4, and the associated description, are both intended to be illustrative only, and should not be treated as limiting on the potential scope of any claims included in this or any related document. For example, in some implementations, rather than having various portions included in a single interface screen, a back end system could be used to power multiple screens, each of which would be dedicated to a particular type of input. Further, in some implementations, there might be screens in addition to, or as alternatives to, those illustrated in FIG. 4. As an example, consider the exemplary output screen illustrated in FIG. 5.

In some implementations, when a system detects a status that requires action based on the business rules (e.g., as defined in an input screen such as shown in FIG. 4), an alter can be set to a staffing information with information such as:

A calculated agent demand, which can be presented in a section of a screen which shows the identified staffing gaps and potential revenue and operating income exposure based on information that has been provided to the system (e.g., on the input screen);

A flexible wage section, which can be presented in a section of a screen which shows any recommended variance to the standard base wage level based on rules provided on the input screen (e.g., call out success rate required); and An agent call out list, which can include names of individuals the system is recommending calling based on the business rules defined on the input screen (e.g., proficiency, previous call out success, overtime hours . . . ).

In a production environment, an administrator could approve a system recommendation (e.g., as shown in a screen such as FIG. 5) which could result in the system automatically calling out to the staff on the list (through email, voice mail or short message) and providing an offer to work at the dynamically calculated wage rate.

Figure 6:
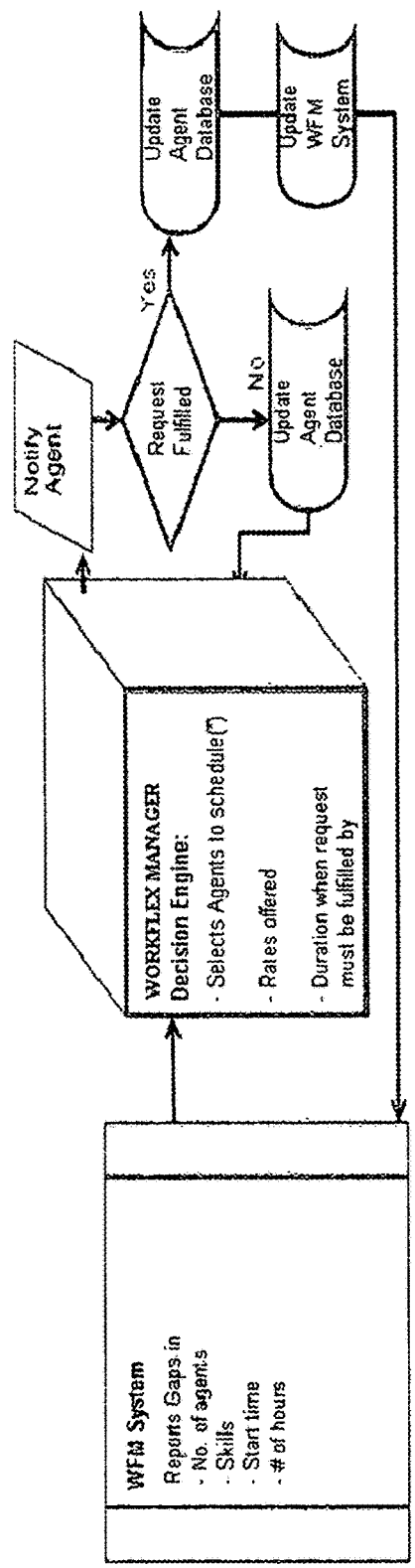
FIG. 6 depicts an exemplary process flow.

FIG. 6 illustrates a process flow (which could be either administrator initiated or self-schedule) which could be implemented using the disclosed technology. The technology disclosed herein, when used in support of process flows as shown in FIG. 6 or otherwise, can be implemented to provide a number of beneficial features (one or more of which may be present in various embodiments), including:

The ability to predefine business rules for intraday staffing;

The ability to calculate optimum wage offers to achieve desired acceptance rate;

The ability for the system to automatically act (e.g., by calling out agents) when a trigger for action is detected;

The ability for agents to self-schedule (e.g., initiating a request) and get a response including a dynamic wage offer; and The ability to make a dynamic wage offer based on business rules and historic success rate data.

As will be immediately apparent to one of ordinary skill in the art, the disclosed technology could be beneficially employed in a broad variety of scenarios, and would be particularly useful in business environments having one or more of the following attributes:

1) Large workforce with common assignment types
2) Variations in demand that are not always predictable
3) Variations in workforce supply that are not always predictable
4) Business sensitivity to intraday gas between workforce supply and demand.
5) Compliance Factors (e.g., labor agreement, overtime rules, seniority guidelines . . . )

Such environments include:

Contact Center Agents (either in-house our outsourced), which is generally characterized by a large hourly workforce, with forecasting capability generally no better that +/−10%. In this application, common business rules attributes could include Agent Proficiency, Overtime Hours Worked, On Call Availability, Time Zone, and Base Wage Rate.

Tech Service Dispatch (e.g., Cable, Telephone, Electric, Heating, Plumbing . . . ) In this application, common business rules attributes could include technical certification, seniority, overtime hours worked, on call availability and proximity to job site.

Health Care Workers (e.g., RN's, Emergency Room staff, Support Staff). In this application, common business rule attributes could include overtime hours worked, on-call availability, and proximity to work site.

Restaurant/Hotel/Hospitality (e.g., Service, Kitchen, Maintenance Staff). This application segment could include a single location (e.g., Large hotel), or multiple locations e.g., fast food chain). In this application, common business rules attributes could include overtime hours worked, on call availability and proximity to job site.

The source code listing appendix submitted herewith comprises source code which can be used to implement two preferred embodiments of the invention described herein. Of course, it should be understood that the preferred embodiment shows in that source code is intended to be illustrative only, and not limiting. Accordingly, instead of limiting the protection accorded by this document, or by any document which is related to this document, to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

EXPLICIT DEFINITIONS

When used in the claims, a statement that something is "based on" something else should be understood to mean that something is determined at least in part by the thing that it is indicated as being "based on." When something is completely determined by a thing, it will be described as being "based EXCLUSIVELY on" the thing.

When used in the claims, "cardinality" should be understood to refer to the number of elements in a set.

When used in the claims, "computer" should be understood to refer to a device, or group of devices, which is capable of performing one or more logical and/or physical operations on data to produce a result. Non-limiting examples of "computers" include servers, laptops, desktops, netbooks, and notebooks, as well as handheld devices such as cellular phones, personal digital assistants, and portable game consoles.

When used in the claims, "computer executable instructions" should be understood to refer to data which can be used to specify physical or logical operations which can be performed by a computer.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Computer memory such as hard discs, read only memory, random access memory, solid state memory elements, optical discs and registers is an example of a "computer readable medium."

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc).

When used in the claims, "database" should be understood be to a collection of data stored on a computer readable medium in a manner such that the data can be retrieved by a computer. The term "database" can also be used to refer to the computer readable medium itself (e.g., a physical object which stores the data).

When used in the claims, the verb "display" refers to the act of providing the thing "displayed" in a visually perceptible form. It should be understood that, in the context of this disclosure, "displaying" refers not only to actually physically presenting a thing on a screen, but also to causing that thing to be presented (e.g., by sending instructions from a local CPU, or by sending information over a network which causes a thing to be "displayed").

When used in the claims, an "element" of a "set" (defined infra) should be understood to refer to one of the things in the "set."

When used in the claims, "remote" should be understood to refer to the relationship between entities which are physically distant from one another, such as between entities that communicate over a network.

When used in the claims, the term "set" should be understood to refer to a number, group, or combination of zero or more things of similar nature, design, or function.

When used in the claims, the term "storing" used in the context of a memory or computer readable medium should be understood to mean that the thing "stored" is reflected in one or more physical properties (e.g., magnetic moment, electric potential, optical reflectivity, etc) of the thing doing the "storing" for a period of time, however brief.

Accordingly, we claim:

1. A machine comprising:
 a) a staff database storing staff data for each worker from a plurality of potential staff members;
 b) a computer configured to dynamically optimize a workforce by, based on detecting a discrepancy between a projected level of staff demand during a shift and an updated level of staff demand during the shift determined based on real time data provided by a workforce management system, performing a set of tasks comprising:
  I) determining one or more actions for addressing the detected discrepancy between the projected level of staff demand during the shift and the updated level of staff demand during the shift, wherein the computer is configured to determine the one or more actions by matching the detected discrepancy against at least one business rule specifying an action to be taken based on a time urgency for the detected discrepancy, wherein the time urgency for the detected discrepancy is a parameter representing:
   A) a magnitude for the detected discrepancy relative to a threshold magnitude from the at least one business rule;
   B) a duration for the detected discrepancy relative to a threshold duration from the at least one business rule; or
   C) a time of day for the detected discrepancy relative to a time period from the at least one business rule;
  II) generating an optimized call out list by identifying one or more workers from the plurality of potential staff members to provide with personalized requests to perform actions from the one or more actions for addressing the detected discrepancy between the projected level of staff demand during the shift and the updated level of staff demand during the shift;
  III) dynamically determining terms for one or more personalized requests based on comparing staff data from the staff database for each worker from the one or more workers with selection criteria corresponding to the one or more actions determined by matching the detected discrepancy against the at least one business rule, wherein the one or more personalized requests comprise a personalized request for each worker from the one or more workers, wherein the terms for each personalized request comprise identification of an action from the one or more actions for addressing the detected discrepancy between the projected level of staff demand during the shift and the updated level of staff demand during the shift; and IV) sending, to each worker from the one or more workers, the personalized request for that worker;

wherein the computer is further configured to:

i) on an ongoing basis after sending the personalized requests to the one or more workers, obtain current updated levels of staff demand during the shift; and ii) each time a response is received from one of the identified one or more workers and the response accepts the personalized request sent to that worker, selectively implementing the action identified in the personalized request based on concurrency controls and the then current updated levels of staff demand during the shift.

2. The machine of claim 1, wherein sending, to each worker from the one or more workers, the personalized request for that worker comprises:

a) retrieving, from the staff database, communication preference information for that worker; and b) sending the personalized request for that worker via a communication channel indicated by the communication preference information for that worker.

3. The machine of claim 1, wherein:

a) the computer is configured to receive, from each worker from the one or more workers, a response to the personalized request for that worker, wherein the response is selected from a set of responses consisting of:

i) an acceptance of the personalized request;

ii) a declination of the personalized request; and iii) a counter offer indicating that worker's willingness take action to address the detected discrepancy between the projected level of staff demand during the shift and the updated level of staff demand during the shift on terms different from the terms included in the personalized request for that worker;

b) the computer is configured to, in response to receiving the counter offer, automatically determine whether to accept or decline the counter offer.

4. The machine of claim 1, wherein the computer is configured to determine the one or more actions for addressing the detected discrepancy between the projected level of staff demand during the shift and the updated level of staff demand during the shift by selecting from a set of actions comprising:

a) reducing the shift;

b) extending the shift;

c) changing a work type to be performed during the shift; and d) volunteering to take time off during the shift.

5. The machine of claim 4, wherein:

a) the terms for each personalized request comprise an identification of compensation to be provided in exchange for agreeing to perform the action identified in that personalized request; and b) dynamically determining terms for one or more personalized requests comprises, for each personalized request for each worker from the one or more workers, dynamically determining the compensation identified in the terms of that personalized request.

6. The machine of claim 1, wherein identifying one or more workers from the plurality of potential staff members to provide with personalized requests to perform actions from the one or more actions for addressing the detected discrepancy between the projected level of staff demand during the shift and the updated level of staff demand during the shift comprises identifying the one or more workers based on one or more factors taken from a set of factors consisting of:

a) whether a candidate for inclusion in the one or more workers is already scheduled to work during the shift;

b) whether the candidate for inclusion in the one or more workers is on vacation;

c) skills of the candidate for inclusion in the one or more workers;

d) wage rate of the candidate for inclusion in the one or more workers;

e) responsiveness of the candidate for inclusion in the one or more workers to historical requests to perform actions for addressing discrepancies between projected levels of staff demand made prior to historical shifts and updated levels of staff demand during the corresponding historical shifts;

f) preferences of the candidate for inclusion in the one or more workers for extra hours;

g) preferences of the candidate for inclusion in the one or more workers for voluntary time off;

h) proficiency of the candidate for inclusion in the one or more workers in work to be done during the shift;

i) status of the candidate for inclusion in the one or more workers as a full time or part time worker;

j) seniority of the candidate for inclusion in the one or more workers;

k) standard hours worked by the candidate for inclusion in the one or more workers during a week in which the shift is included;

l) overtime hours worked by the candidate for inclusion in the one or more workers during the week in which the shift is included; and m) number of times the candidate for inclusion in the one or more workers has agreed to perform an action from the one or more actions for addressing the detected discrepancy between the projected level of staff demand during the shift and the updated level of staff demand during the shift;

wherein the computer is configured to identify the one or more workers based on one or more factors taken from the set of factors by data stored in a memory of the computer and encoding each factor from the set of factors.

7. The machine of claim 1, wherein:

a) the staff data from the staff database further comprises, for each worker:

i) a location for that worker, wherein the computer is configured to use the location for that worker to calculate a distance between the location for that worker and a location where the action for addressing the detected discrepancy between the projected level of staff demand during the shift and the updated level of staff demand during the shift would be performed; and ii) a normal wage for that worker; and b) the computer is configured to perform one or more of the tasks of:

i) determining one or more actions for addressing the detected discrepancy between the projected level of staff demand during the shift and the updated level of staff demand during the shift; and ii) dynamically determining terms for one or more personalized requests;

based on business information comprising:
I) a time of day the discrepancy between the projected level of staff demand during the shift and the updated level of staff demand during the shift is detected;
II) an expected duration for the detected discrepancy between the projected level of staff demand during the shift and the updated level of staff demand during the shift;
III) a magnitude for the detected discrepancy between the projected level of staff demand during the shift and the updated level of staff demand during the shift; and
IV) contract requirements impacted by the detected discrepancy between the projected level of staff demand during the shift and the updated level of staff demand during the shift.

8. The machine of claim 1, wherein:
a) the computer is configured to detect a discrepancy between the projected level of staff demand during the shift and the updated level of staff demand during the shift when the projected level of staff demand during the shift exceeds the updated level of staff demand during the shift;
b) the computer is configured to, when the projected level of staff demand made prior to the shift exceeds the updated level of staff demand during the shift, determine the one or more actions for addressing the detected discrepancy between the projected level of staff demand during the shift and the updated level of staff demand during the shift by selecting from a set of actions comprising:
i) reducing the shift;
ii) performing a new type of work different from a work type assigned prior to the shift;
iii) taking time off during the shift; and
iv) canceling the shift.

9. The machine of claim 8, wherein:
a) the updated level of staff demand is an actual level of staff demand during the shift; and
b) the computer is configured to perform the set of tasks during the shift.

10. A method of optimizing a workforce comprising:
a) performing a set of triggering tasks comprising detecting a discrepancy between a projected level of staff demand during a shift and an updated level of staff demand during the shift determined based on real time data provided by a workforce management system;
b) based on the set of triggering tasks, performing a set of tasks comprising:
i) determining one or more actions for addressing the detected discrepancy between the projected level of staff demand during the shift and the updated level of staff demand during the shift, wherein determining the one or more actions comprises matching the detected discrepancy against at least one business rule specifying an action to be taken based on a time urgency for the detected discrepancy, wherein the time urgency for the detected discrepancy is a parameter representing:
A) a magnitude for the detected discrepancy relative to a threshold magnitude from the at least one business rule;
B) a duration for the detected discrepancy relative to a threshold duration from the at least one business rule; or
C) a time of day the detected discrepancy relative to a time period from the at least one business rule;
ii) generating an optimized call out list by identifying one or more workers from a plurality of potential staff members to provide with personalized requests to perform actions from the one or more actions for addressing the detected discrepancy between the projected level of staff demand during the shift and the updated level of staff demand during the shift;
iii) dynamically determining terms for one or more personalized requests based on comparing staff data from the staff database for each worker from the one or more workers with selection criteria corresponding to the one or more actions determined by matching the detected discrepancy against the at least one business rule, wherein the one or more personalized requests comprise a personalized request for each worker from the one or more workers, wherein the terms for each personalized request comprise identification of an action from the one or more actions for addressing the detected discrepancy between the projected level of staff demand during the shift and the updated level of staff demand during the shift; and
iv) sending, to each worker from the one or more workers, the personalized request for that worker;
wherein each of the tasks from the set of triggering tasks, and each of the tasks from the set of tasks is performed by a computer based on execution of instructions stored on a non-transitory computer readable medium; and
wherein the instruments stored on the non-transitory computer readable medium are operable to configure the computer to:
i) on an ongoing basis after sending the personalized requests to the one or more workers, obtain current updated levels of staff demand during the shift; and
ii) each time a response is received from one of the identified one or more workers and the response accepts the personalized request sent to that worker, selectively implementing the action identified in the personalized request based on concurrency controls and the then current updated levels of staff demand during the shift.

11. The method of claim 10, wherein the set of tasks further comprises:
a) receiving, from a worker from the one or more workers, a response to the personalized request for that worker, wherein the response is a counter offer indicating that worker's willingness take action to address the detected discrepancy between the projected level of staff demand during the shift and the updated level of staff demand during the shift on terms different from the terms included in the personalized request for that worker;
b) automatically determining whether to accept or decline the counter offer.

12. The method of claim 10, wherein determining the one or more actions for addressing the detected discrepancy between the projected level of staff demand during the shift and the updated level of staff demand during the shift comprises selecting from a set of actions comprising:
a) reducing the shift;
b) extending the shift;
c) changing a work type to be performed during the shift;
d) volunteering to take time off during the shift; and
e) canceling the shift.

13. The method of claim 12, wherein:
a) the terms for each personalized request comprise an identification of compensation to be provided in exchange for agreeing to perform the action identified in that personalized request; and b) dynamically determining terms for one or more personalized requests comprises, for each personalized request for each worker from the one or more workers, dynamically determining the compensation identified in the terms of that personalized request.

14. The method of claim 10, wherein identifying one or more workers from the plurality of potential workers to provide with personalized requests to perform actions from the one or more actions for addressing the detected discrepancy between the projected level of staff demand during the shift and the updated level of staff demand during the shift comprises identifying the one or more workers based on one or more factors taken from a set of factors consisting of:

a) whether a candidate for inclusion in the one or more workers is already scheduled to work during the shift;
b) whether the candidate for inclusion in the one or more workers is on vacation;
c) skills of the candidate for inclusion in the one or more workers;
d) wage rate of the candidate for inclusion in the one or more workers;
e) responsiveness of the candidate for inclusion in the one or more workers to historical requests to perform actions for addressing discrepancies between projected levels of staff demand made prior to historical shifts and updated levels of staff demand during the corresponding historical shifts;
f) preferences of the candidate for inclusion in the one or more workers for extra hours;
g) preferences of the candidate for inclusion in the one or more workers for voluntary time off;
h) proficiency of the candidate for inclusion in the one or more workers in work to be done during the shift;
i) status of the candidate for inclusion in the one or more workers as a full time or part time worker;
j) seniority of the candidate for inclusion in the one or more workers;
k) standard hours worked by the candidate for inclusion in the one or more workers during a week in which the shift is included;
l) overtime hours worked by the candidate for inclusion in the one or more workers during the week in which the shift is included; and
m) number of times the candidate for inclusion in the one or more workers has agreed to perform an action from the one or more actions for addressing the detected discrepancy between the projected level of staff demand during the shift and the updated level of staff demand during the shift;

and wherein identifying one or more workers from the plurality of potential workers to provide with personalized requests to perform actions from the one or more actions for addressing the detected discrepancy between the projected level of staff demand during the shift and the updated level of staff demand during the shift is performed by a computer based on data stored in a memory of the computer and encoding each factor from the set of factors.

15. The method of claim 10, wherein the staff data from the staff database further comprises, for each worker:

a) a location for that worker, wherein the computer is configured to use the location for that worker to cal culate a distance between the location for that worker and a location where the action for addressing the detected discrepancy between the projected level of staff demand during the shift and the updated level of staff demand during the shift would be performed; and
b) a normal wage for that worker.

16. The method of claim 10, wherein:
a) detecting the discrepancy between the projected level of staff demand during the shift and the updated level of staff demand during the shift comprises detecting that the projected level of staff demand during the shift exceeds the updated level of staff demand during the shift;
b) determining the one or more actions for addressing the detected discrepancy between the projected level of staff demand during the shift and the updated level of staff demand during the shift comprises selecting from a set of actions comprising:
   i) reducing the shift;
   ii) performing a new type of work different from a work type assigned prior to the shift;
   iii) taking time off during the shift; and
   iv) canceling the shift.

17. The method of claim 16, wherein:
a) the updated level of staff demand is an actual level of staff demand during the shift; and
b) the tasks from the set of triggering tasks and the tasks from the set of tasks are performed during the shift.

18. A machine comprising:
a) a staff database storing staff data for each worker from a plurality of potential staff members;
b) a means for:
   i) detecting a discrepancy between a projected level of staff demand during a shift and an updated level of staff demand during the shift based on real time data provided by a workforce management system;
   ii) determining one or more actions for responding to the detected discrepancy;
   iii) generating an optimized call out list of workers to provide with personalized requests to perform actions for addressing the detected discrepancy;
   iv) dynamically determining terms for the one or more personalized requests; and
   v) sending the personalized requests to the workers on the optimized callout list;
wherein the means is configured to:
   I) on an ongoing basis after sending the personalized requests to the workers on the optimized callout list, obtain current updated levels of staff demand during the shift; and
   II) each time a response is received from one of the workers on the optimized callout list and the response accepts the personalized request sent to that worker, selectively implementing the action identified in the personalized request based on concurrency controls and the then current updated levels of staff demand during the shift.

* * * * *

UNITED STATES PATENT AND TRADEMARK OFFICE
CERTIFICATE OF CORRECTION

PATENT NO. : 9,595,016 B1
APPLICATION NO. : 13/136724
DATED : March 14, 2017
INVENTOR(S) : Larry S. Schwartz It is certified that error appears in the above-identified patent and that said Letters Patent is hereby corrected as shown below:

In the Claims

Column 21, Claim 3.a)iii), Line 35, reads "...take action to address..."; which should be deleted and replaced with "...to take action to address...."

Column 23, Claim 10.b)i)C), Line 66, reads "...a time of day the detected discrepancy..."; which should be deleted and replaced with "...a time of day for the detected discrepancy..."

Column 24, Claim 11.a), Line 47, reads "...worker's willingness take action..."; which should be deleted and replaced with "...worker's willingness to take action..."

Signed and Sealed this
Twenty-seventh Day of March, 2018

Andrei Iancu
*Director of the United States Patent and Trademark Office*